(12) United States Patent
Muchtar et al.

(10) Patent No.: US 10,173,395 B2
(45) Date of Patent: Jan. 8, 2019

(54) HARDFACING INCORPORATING CARBIDE PARTICLES

(71) Applicant: VERMEER MANUFACTURING COMPANY, Pella, IA (US)

(72) Inventors: Wanti Muchtar, Pella, IA (US); David Landon, Pella, IA (US)

(73) Assignee: VERMEER MANUFACTURING COMPANY, Pella, IA (US)

( * ) Notice: Subject to any disclaimer, the term of this patent is extended or adjusted under 35 U.S.C. 154(b) by 85 days.

(21) Appl. No.: 15/142,231

(22) Filed: Apr. 29, 2016

(65) Prior Publication Data

US 2016/0318282 A1    Nov. 3, 2016

Related U.S. Application Data

(63) Continuation-in-part of application No. PCT/US2014/063336, filed on Oct. 31, 2014.
(Continued)

(51) Int. Cl.
*B22F 7/00* (2006.01)
*B32B 15/01* (2006.01)
(Continued)

(52) U.S. Cl.
CPC .............. *B32B 15/011* (2013.01); *B23K 9/04* (2013.01); *B23K 35/308* (2013.01);
(Continued)

(58) Field of Classification Search
None
See application file for complete search history.

(56) References Cited

U.S. PATENT DOCUMENTS

| 3,800,891 A | 4/1974 | White et al. |
| 4,053,306 A | 10/1977 | Rodriguez |

(Continued)

FOREIGN PATENT DOCUMENTS

| CN | 2756353 Y | 2/2006 |
| CN | 101224527 A | 7/2008 |

(Continued)

OTHER PUBLICATIONS

Ador Fontech Limited "Low Heat Input Welding Alloys," Specification Sheet for LH 721. Accessible on the Internet at URL: http://adorfon.asia/products/consumables/lhalloy/hf/hf721.pdf. [Last Accessed Aug. 28, 2017] 1 pg.
(Continued)

*Primary Examiner* — Seth Dumbris
(74) *Attorney, Agent, or Firm* — Michael Best & Friedrich LLP

(57) ABSTRACT

Embodiments of hardfacing layers in which wear resistant particles are substantially uniformly distributed in a matrix material are provided. The composition and microstructure of the matrix material and the amount, size and distribution of the wear resistant particles can be such that the hardfacing is wear resistant but still retains some toughness. The matrix material may include two components, a first component including iron, chromium and nickel and a second component including chromium and a substantial amount of carbon. The combination of the two components provides hardness and toughness to the matrix material. In embodiments of the disclosure, the wear resistant particles include tungsten. A hardfaced article, in one embodiment, may be formed by fusion welding an austenitic stainless steel filler metal to the surface of a base metal, thereby generating a weld pool; and adding a plurality of particles including tungsten carbide to the weld pool.

15 Claims, 12 Drawing Sheets

Related U.S. Application Data

(60) Provisional application No. 61/898,037, filed on Oct. 31, 2013.

(51) Int. Cl.

| | | |
|---|---|---|
| *B23K 35/30* | (2006.01) | |
| *B23K 35/32* | (2006.01) | |
| *C22C 38/44* | (2006.01) | |
| *B23K 9/04* | (2006.01) | |
| *C22C 38/00* | (2006.01) | |
| *C22C 38/02* | (2006.01) | |
| *C22C 38/42* | (2006.01) | |
| *C22C 38/46* | (2006.01) | |
| *C22C 38/58* | (2006.01) | |

(52) U.S. Cl.
CPC ............ *B23K 35/327* (2013.01); *C22C 38/44* (2013.01); *B32B 2307/208* (2013.01); *B32B 2307/536* (2013.01); *C22C 38/001* (2013.01); *C22C 38/002* (2013.01); *C22C 38/02* (2013.01); *C22C 38/42* (2013.01); *C22C 38/46* (2013.01); *C22C 38/58* (2013.01)

(56) References Cited

U.S. PATENT DOCUMENTS

| | | | |
|---|---|---|---|
| T967,009 | I4 | 2/1978 | Gale |
| 4,097,711 | A | 6/1978 | Banerjee |
| 4,256,518 | A | 3/1981 | Bolton et al. |
| 4,608,318 | A | 8/1986 | Makrides et al. |
| 4,803,045 | A | 2/1989 | Ohriner et al. |
| 4,814,236 | A | 3/1989 | Qureshi et al. |
| 4,837,417 | A | 6/1989 | Funk |
| 4,929,419 | A | 5/1990 | Wegman et al. |
| 5,030,519 | A | 7/1991 | Scruggs et al. |
| 5,051,112 | A | 9/1991 | Keshavan et al. |
| 5,234,510 | A | 8/1993 | DuBois |
| 5,246,056 | A | 9/1993 | Lomax et al. |
| 5,720,830 | A | 2/1998 | Wragg et al. |
| 6,197,437 | B1 | 3/2001 | Bielec et al. |
| 6,280,370 | B1 | 8/2001 | Falkenhagen |
| 6,440,358 | B1 | 8/2002 | Sreshta et al. |
| 7,666,244 | B2 * | 2/2010 | Lockwood ............ B23K 35/327 175/374 |
| 7,691,173 | B2 | 4/2010 | Eason et al. |
| 8,002,052 | B2 | 8/2011 | Stevens et al. |
| 8,097,095 | B2 | 1/2012 | Branagan |
| 8,124,007 | B2 | 2/2012 | Menon et al. |
| 8,137,613 | B2 | 3/2012 | Osuki et al. |
| 8,147,980 | B2 | 4/2012 | Bhide |
| 8,187,529 | B2 | 5/2012 | Powell |
| 8,377,510 | B2 | 2/2013 | Lyons et al. |
| 8,399,793 | B2 | 3/2013 | Whalen et al. |
| 8,419,868 | B2 | 4/2013 | Lai |
| 8,430,980 | B2 | 4/2013 | Muir et al. |
| 8,460,604 | B2 | 6/2013 | Junod et al. |
| 8,679,227 | B2 | 3/2014 | Falconer et al. |
| 2006/0005662 | A1 | 1/2006 | Lockwood et al. |
| 2006/0207803 | A1 | 9/2006 | Overstreet |
| 2007/0187458 | A1 | 8/2007 | Menon et al. |
| 2008/0102300 | A1 | 5/2008 | Bhide |
| 2010/0080727 | A1 | 4/2010 | Powell |
| 2010/0147247 | A1 | 6/2010 | Qiao et al. |
| 2010/0230173 | A1 | 9/2010 | Xia et al. |
| 2010/0236834 | A1 | 9/2010 | Xia et al. |
| 2011/0068152 | A1 * | 3/2011 | Cheney .............. B23K 35/3093 228/177 |
| 2011/0073378 | A1 | 3/2011 | Overstreet |
| 2011/0121056 | A1 | 5/2011 | Cheney et al. |
| 2011/0308670 | A1 | 12/2011 | Branagan |
| 2012/0141829 | A1 | 6/2012 | Oikawa et al. |
| 2012/0192760 | A1 * | 8/2012 | Overstreet .............. E21B 10/46 106/286.3 |
| 2013/0206483 | A1 | 8/2013 | Johnson et al. |

FOREIGN PATENT DOCUMENTS

| | | |
|---|---|---|
| CN | 102676941 A | 9/2012 |
| CN | 102686762 A | 9/2012 |
| DE | 19711642 A1 | 9/1998 |
| EP | 0 753 375 A2 | 1/1997 |
| GB | 1499602 A | 2/1978 |
| GB | 2260600 A | 4/1993 |
| JP | 2002-356734 A | 12/2002 |
| WO | WO 1994/026942 A1 | 11/1994 |
| WO | WO 2009/020901 A1 | 2/2009 |
| WO | WO 2011/035193 A1 | 3/2011 |
| WO | WO 2011/066307 A2 | 6/2011 |

OTHER PUBLICATIONS

American Welding Society (2012) Chemical Composition Requirements AWS Class 5.9.

Baker (2013) "Tungsten Carbide Hardfacing," Weld.com.

Bedolla-Jacuinde (2005) "SEM study on the $M_7C_3$ carbide nucleation during eutectic solidification of high-chromium white irons," Z. Metallkd. 96(12):1380-1385.

Borwornkiatkaew (2010) "Metallography and Microstructure of Tungsten Carbide Particulate-Reinforced Stainless Steel Matrix Composites," Journal of the Microscopy Society of Thailand. 24(1):33-36.

Buchely et al. (2005) "The effect of microstructure on abrasive wear of hardfacing alloys," Wear. 259:52-61.

Choteborsky et al. (2008) "Abrasive wear of high chromium Fe-Cr-C hardfacing alloys," Res. Agr. Eng. 54(4):192-198.

Cole Parmer "Sieves," Product Specifications. p. 1880. Accessible on the Internet at URL: https://pim-resources.coleparmer.com/catalog-page/t-1880.pdf. [Last Accessed Aug. 28, 2017].

Craco GmBH, "75 years experience," Accessible on the Internet at URL: http://www.craco.de/overview.html. [Last Accessed Aug. 29, 2017] 3 pgs.—English Machine Translation.

Cverna (2002) "Thermal Expansion," Ch. 2 In; ASM Ready Reference, Thermal Properties of Material. pp. 9-12.

David et al. (1979) "Solidification Behavior of Austenitic Stainless Steel Filler Metals," Welding J. 58(Research Supplement):330s-336s.

Elmer et al. (1989) "Microstructural Development during Solidification of Stainless Steel Alloys," Metallurgical Transactions A. 20A:2117-2131.

ESAB "Hard-Facing with Tungsten Carbide," Accessible on the Internet at URL: http://www.esabna.com/euweb/oxy_handbook/589oxy18_13.htm. [Last Accessed Aug. 28, 2017] 1 pg.

European Search Report corresponding to European Patent Application No. 14856830.6, dated Jul. 31, 2017.

Gooch et al. (1980) "Welding Variables and Microfissuring in Austenitic Stainless Steel Weld Metal," Welding J. 59(Research Supplement):223s-241s.

Grinder Wear Parts Inc. "Our Quality Wear Parts," Accessible on the Internet at URL: http://www.grinderwearparts.com. [Last Accessed Aug. 29, 2017] 2 pgs.

Hardface Technologies "Tungsten Carbide Hardfacing," Accessible on the Internet at URL: http://www.tungstencarbidehardfacing.com. [Last Accessed Aug. 28, 2017] 1 pg.

Hsieh (2008) "Microstructural evolution during the $\delta/\sigma/\gamma$ phase transformation of the SUS 309LSi stainless steel after aging under various nitrogen atmospheric ratios," Materials Science and Engineering A-Structural Materials Properties Microstructure and Processing. 475(1-2):128-135.

International Search Report with Written Opinion corresponding to International Patent Application No. PCT/US2014/063336, dated Feb. 16, 2015.

Kennametal Inc. "About Us," Accessible on the Internet at URL: https://www.kennametal.com/en/about-us/company-profile.html. [Last Accessed Aug. 29, 2017] 2 pgs.

Li et al. (2003) "Microstructure and dry sliding wear behavior of laser clad Ni-based alloy coating with the addition of SiC," Wear. 254(3-4):222-229.

(56) References Cited

OTHER PUBLICATIONS

Lin et al. (Jun. 2009) "Precipitation examination of δ, σ, and γ phases using modified Cr/Ni equivalent ratios during the multipass welding of stainless steels," Metals and Materials International. 15(3):507-514.
Lincoln Electric (Update from Sep. 2009) "Hardfacing Product Catalogue," Accessible on the Internet at URL: http://www.lincolnelectric.com/assets/US/EN/literature/C710.pdf. [Last Accessed Aug. 28, 2017] pp. 1-55.
Mohler (1982) "Welding Stainless-Steel Pipe and Tubing," Ch. 9 In; Practical Welding Technology. Industrial Press, Inc. p. 133-150.
NanoSteel (Jul. 23, 2007) "NanoSteel redefines hardfacing with new patented weld material," Press Release. 2 pgs.
Polymet Corporation (Oct. 7, 2011) "Polymet Introduces New Tungsten Carbide Hardfacing Wires," Press Release. Word Press. Accessible on the Internet at URL: https://polymet.wordpress.com/2011/10/07/polymet-introduces-new-tungsten-carbide-hardfacing-wires. [Last Accessed Aug. 28, 2017] 3 pgs.
Postle Industries, Inc. "Mig Tungsten Carbide: The Ultimate in Abrasion Resistance," Data Sheet. Accessible on the Internet at URL: http://www.tungstencarbidehardfacing.com/tungstencarbidehardfacing/uploads/application-equipment-and-procedures.pdf. [Last Accessed Aug. 28, 2017] 7 pgs.
Postle Industries, Inc. "The best in hardfacing," Accessible on the Internet at URL: http://tungstencarbidehardfacing.com/tungstencarbidehardfacing/uploads/estimated-cost-and-savings.pdf. [Last Accessed Aug. 28, 2017] 14 pgs.
Robotic Welded Parts (RWP) Incorporation. "About Us," Accessible on the Internet at URL: http://rwp-inc.com. [Last Accessed Aug. 29, 2017] 2 pgs.
Select Arc (Mar. 2013) "Select-Arc Premium Welding Products," Full-Line Catalogue.
Sulzer Metco (Apr. 2006) "Woka PlasmaDur™ Powder Materials for PTA Hardfacing Applications," Bulletin No. 10-700.
Sulzer Metco (Jul. 2012) "Woka PlasmaDur™ Powder Materials for PTA Hardfacing Applications," Bulletin No. 10-700.
Surfacetek (Sep. 2010) "Welding Product Guide," Product Catalogue.
Technogenia (Jul. 2, 2013) "Carbide deposits using laser technology by Technogenia," Youtube.com. Accessible on the Internet at URL: http://www.youtube.com/watch?v=sYSpStpLep8. [Last Accessed Aug. 28, 2017] 2 pgs.
Technogenia (Jul. 2, 2013) "Technogenia : Tungsten carbide-based abrasion-resistant welding products," Youtube.com. Accessible on the Internet at URL: https://www.youtube.com/watch?v=YbZccd8KrvQ. [Last Accessed Aug. 29, 2017] 2 pgs.
Underground Tools Incorporated (UTI) "About Underground Tools, Inc.," Accessible on the Internet at URL: http://www.undergroundtools.com. [Last Accessed Aug. 29, 2017] 1 pg.
USM Inc. "About Us," Accessible on the Internet at URL: http://www.usminc.com/about-us. [Last Accessed Aug. 29, 2017] 2 pgs.
Washington Alloy Co. Product Catalogue. Accessible on the Internet at URL: http://weldingwire.com//product-literature. [Last Accessed Aug. 29, 2017] 133 pgs.
Yamamoto et al. (2009) "Solidification of High Chromium Cast Iron Substituted by 25 to 70 mass% Ni for Fe," Materials Transactions. 50(9):2253-2258.

* cited by examiner

HARDFACING INCORPORATING CARBIDE PARTICLES

CROSS-REFERENCE TO RELATED APPLICATIONS

This application is continuation-in-part of International Application PCT/US2014/063336, filed Oct. 31, 2014, which claims the benefit of priority of U.S. Provisional Application No. 61/898,037, filed Oct. 31, 2013, each of which is hereby incorporated by reference in their entireties.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND AND INTRODUCTION

Hardfacing as a process generally refers to application of a hard and wear resistant material to the surface of a second material. When a hardfacing layer is applied to a second material that is a metal. The metal may be a pure metal or metal alloy. The hardfaced metal may be referred to as the base metal. The hard and wear resistant material may be a composite material which incorporates wear resistant particles in a matrix of a component, such as a metal.

Hardfacing application techniques frequently include welding and/or spraying. Welding may be defined as the joining of two or more pieces of metal by applying heat, pressure or both to produce a localized union through fusion or recrystallization across the interface (ASM Metals Reference Book, ed. M. Bauccio, 1993, ASM International). In fusion welding with a filler metal, both the filler metal and the base metal are melted together to complete the weld.

Fusion welding techniques include, but are not limited to, oxyfuel gas welding, resistance welding, laser beam welding, electron beam welding and arc welding. Gas metal arc welding (GMAW) is an arc welding process which produces coalescence of metals by heating them with an arc between a continuous filler metal (consumable) electrode and the workpiece. Shielding is obtained from an externally supplied gas or gas mixture. Variations of GMAW include short circuit transfer, globular transfer, spray arc transfer and pulsed arc transfer depending on welding parameters and equipment variation. GMAW may use an external shield gas that may be a largely inert gas, such as argon, a mixture of argon and other gases or a reactive gas such as carbon dioxide For GMAW welding direct current is typically used; the electrode may be either positive or negative.

BRIEF SUMMARY

In one aspect, the invention provides a hardfacing layer in which wear resistant particles are substantially uniformly distributed in a matrix material. The composition and microstructure of the matrix material and the amount, size and distribution of the wear resistant particles can be such that the hardfacing is wear resistant but still retains some toughness.

In some aspects, the hardfacing is sufficiently limited in magnetic properties to avoid undesirable interference with instrumentation such as downhole instrumentation relying on magnetic measurements. For example, magnetic measurements may be used to determine the position and direction of drill heads.

The matrix material may comprise two components, a first component comprising iron, chromium, and nickel; and a second component comprising chromium, tungsten, iron, and a substantial amount of carbon. The second component may comprise one or more metal carbide phases. The combination of the two components can provide hardness and toughness to the matrix material.

The hardfacing layer may be formed by a fusion welding process in which wear resistant particles are added to the molten weld pool. Fusion welding processes suitable for use with the invention may include GMAW, FCAW (flux cored arc welding), PAW (plasma arc welding), LW (laser welding), GTAW (gas tungsten arc welding) and SAW (submerged arc welding). In an embodiment, the filler metal for the welding process is an austenitic stainless steel comprising chromium and nickel, and tungsten carbide particles are added to the molten weld pool. In an aspect of the invention, the hardfacing materials of the invention are applied to the surface of an article using a GMAW process. The welding process may be, for example, semi-automatic or robotic, which would allow for programming of the movement of the welding gun. During the fusion welding process, the composition of the filler metal may be modified by dilution from the base metal and/or reaction between the filler metal and the wear resistant particles. For example, when the base metal is ferrous but has a lower alloy content than the filler metal, the filler metal may be "diluted" by the base metal. When the molten filler metal partially dissolves the wear resistant particles, elements from the wear resistant particles may be incorporated into the filler metal. Reaction between the filler metal and the wear resistant particles may also lead to formation of reaction products in the vicinity of the wear resistant particles.

The composition and other properties of the matrix and/or the matrix components may be referenced to depth zones within the hardfacing. In an embodiment, the hardfacing may be viewed as comprising three zones, an outer zone nearest the outer surface of the hardfacing, an inner zone nearest the interface or fusion joint between the hardfacing and the base metal and a middle zone between the outer and inner zones. In an embodiment where the zones are of equal thickness, the thickness of each zone may be one-third the local thickness of the hardfacing. If the thickness of the hardfacing varies with position along the article, the thickness of the zones may also vary with position along the article.

In another embodiment, properties of the hardfacing may be measured within a specified distance from the outer (free) surface of the hardfacing or from the bonding/joint interface of the hardfacing with the base metal. In an embodiment where the hardfacing is at least 3 mm thick, the properties of the hardfacing are measured within a surface region or "near surface" region within 1.25 mm or 1 mm from the outer surface and measured within a fusion joint region or "near fusion joint" region within 1.25 mm or 1 mm from the fusion joint. In another embodiment, where the hardfacing is at least 2 mm thick, the surface region or "near surface" region is within 0.75 mm of the outer surface and the fusion joint region or "near fusion joint" region may be within 0.75 mm of the fusion joint. In another embodiment, where the hardfacing is at least 1 mm thick, the surface region or "near surface" region is within 0.3 mm of the outer surface and the fusion joint region or "near fusion joint" region may be within 0.3 mm of the fusion joint.

In an embodiment, the hardness of the matrix material varies with depth in the hardfacing, with the hardness of the matrix material being greater near the outer surface of the hardfacing than near the fusion joint between the hardfacing and the base metal. In an embodiment, the hardness of the matrix is greater in the outer zone of the hardfacing than in the inner zone of the hardfacing. The hardness of the matrix material may also be greater in the middle zone of the hardfacing than in the inner zone of the hardfacing. The hardness of the matrix material is typically measured so as to include contributions from both the first and second components of the matrix material.

The composition of the matrix material typically includes contributions from both the first and second components of the matrix material (and so may be viewed as an average of the compositions of the first and second components of the matrix material). In an embodiment, the composition of the matrix material at a particular depth in the hardfacing may be measured sufficiently far away from the wear resistant particles so that the contribution of any reaction products around the particles is excluded In an embodiment, the chromium content of the matrix material varies with depth in the hardfacing, with the chromium content of the matrix material being greater near the outer surface of the hardfacing than near the fusion joint between the hardfacing and the base metal. In an embodiment, the chromium content of the matrix material is greater in the outer zone of the hardfacing than in the inner zone of the hardfacing. The chromium content of the matrix material may also be greater in the middle zone of the hardfacing than in the inner zone of the hardfacing. In an embodiment, the average chromium content of the matrix material in the outer zone or in a surface region is from 14 to 25 wt % chromium. In an embodiment, the average amount of chromium in the inner zone or fusion joint region is from 7 to 15 wt %.

In an embodiment, a first component of the matrix material comprises an iron based alloy, the iron based alloy further comprising chromium and nickel. The iron based alloy may further comprise chromium, nickel and carbon; or chromium, nickel, carbon and tungsten. In embodiments, at least some of the iron based alloy is in the form of dendrites. In further embodiments, the dendritic iron based alloy comprises an austenitic microstructure (f.c.c. crystal structure). In an embodiment, at least a portion of the iron based alloy comprises from 10 to 25 wt % chromium and from 8 to 35 wt % nickel. In an embodiment, this portion of the iron based alloy is located in the surface region of the hardfacing layer. In another embodiment, the composition of a portion of the iron based alloy in the surface region includes from 14 to 20 wt % chromium.

In an embodiment, the second component of the matrix material is interdendritic, being located between the dendrites of the iron based alloy. Gradients in composition may also exist in this second component. The second component of the matrix material may comprise chromium and carbon; iron, chromium and carbon; iron, tungsten and carbon; or iron, chromium, tungsten and carbon.

In one aspect, the invention provides a hardfacing layer joined to at least a portion of a metal surface. The hardfacing layer may be viewed as comprising an outer surface and an inner surface, the inner surface being joined to the metal surface by a metal fusion bond. The as-fabricated thickness of the hardfacing may be from 1 mm (about 0.039") to 10 mm (about 0.39"), or 2 mm (about 0.08") to 9 mm (about 0.35"). The hardness in the hardfacing may be from 25 to 55 HRC. In an embodiment, the average hardness of the matrix material in the outer zone of the hardfacing layer is from 35 to 55 HRC, the average hardness in the middle zone is from 30 to 45 HRC and the average hardness in the inner zone is from 25 to 40 HRC. In an embodiment, the average hardness of the matrix material in a surface region is from 35 to 55 HRC. In an aspect, the wear number of the hardfacing is 5.5-11, 6.0 to 11, 6.5 to 11 or 7 to 11, as measured using ASTM standard B611.

The hardfacing layers of the invention may comprise a matrix material and plurality of wear resistant particles substantially uniformly distributed in the matrix material. In a preferred embodiment, at least some of the wear resistant particles are not formed in-situ. The wear resistant particles may be particles comprising tungsten carbide. The average volume fraction of particles comprising tungsten carbide in the hardfacing layer may be from 30% to 60%, 30-55%, 30-50%, 40 to 60%, or 30 to 50%.

The matrix may comprise a first component comprising an iron based alloy, the iron based alloy further comprising chromium and nickel and a second component comprising carbon and chromium. At least a portion of the iron based alloy of the first component may be dendritic and the second component may be interdendritic. The composition of the matrix material at a particular location in the hardfacing may comprise 7-28 wt % Cr, 2.5-35 wt % Ni, 5-50 wt % W, and 30-75 wt % Fe, 8-25 wt % Cr, 2.5-30 wt % Ni, 6-45.5 wt % W and 34-70 wt % Fe or 8-25 wt % Cr, 2.5-15 wt % Ni, 6-45.5 wt % W and 34-70 wt % Fe. Further, the composition of the matrix material at a particular location in the hardfacing may comprise 2-10 wt % C, 7-28 wt % Cr, 2.5-35 wt % Ni, 5-50 wt % W, and 30-75 wt % Fe, from 2.5-9 wt % C, 8-25 wt % Cr, 2.5-30 wt % Ni, 6-45.5 wt % W and 34-70 wt % Fe or from 2.5-9 wt % C, 8-25 wt % Cr, 2.5-15 wt % Ni, 6-45.5 wt % W and 34-70 wt % Fe. The composition may be measured with energy dispersive spectroscopy (EDS).

In an aspect, the hardfacing layer and/or base material has limited magnetic characteristics. In embodiment, the hardfacing layer and/or base material meets industry standards for materials that may be deemed to be acceptably "non-magnetic." In embodiments, the hardfacing layer and/or base material is "weakly magnetic." In further embodiments, the hardfacing layer and/or base material is paramagnetic or weakly ferromagnetic. One measure of the response of a material to a magnetic field is the relative permeability)($\mu/\mu_o$) or the magnetic susceptibility ($1-\mu/\mu_o$) As examples, the hardfacing layer and/or base material has a relative permeability or maximum relative permeability, from 1 to 2, from 1 to 1.75, from 1 to 1.5 from 1 to 1.25, from 1 to 1.1, from 1 to 1.05, from 1 to less than 1.01, less than or 1.01 less than or equal to 1.005, or from 1.00 to 1.005. As another example, the hardfacing layer and/or base layer meets a standard for non-magnetic materials, such as the American Petroleum Institute (API) specifications for rotary drill stem elements (API Spec 7-1). In further embodiments, the hardfacing and/or base layer has a maximum deviation from a uniform magnetic field or a residual magnetization less than +/−0.10 microTesla less than +/−0.05 microTesla; in some embodiments, the residual magnetization is measured following saturation. In some embodiments, the filler metal for the welding process is an austenitic stainless steel.

In another aspect, the invention provides articles of manufacture comprising a hardfacing layer of the invention. The articles may comprise a feature, such as an edge, the feature comprising a metal surface. The hardfacing layer is joined to at least a portion of the metal surface. The feature may be present on a tooth, knife, blade, flail, block, hammer, anvil, plate, tang, raiser, drum skin, pocket or screen and may provide, for example, cutting or abrading action and/or wear resistance in use. Applications for articles including hardfacing layers made using stainless steel filler wire include, but are not limited to, high temperature and/or corrosive wear applications, such as pulp and paper manufacture, high temperature furnace boilers and turbines. Articles including hardfacing layers and base materials with limited magnetic characteristics include, but are not limited to drilling elements such as horizontal or vertical drilling elements. As examples, such hardfacing layers are applied to drill collars or other drill string components such as drill pipe tool joints and heavy weight pipe.

The invention may further provide an apparatus comprising the hardfacing layers of the invention. For example, the invention may provide a comminution apparatus such as a chipping, grinding, or shredding apparatus which comprises the hardfacings of the invention. The invention may also provide an apparatus for trenching, boring, or surface mining which comprises the hardfacings of the invention. Yet further, the invention might provide an apparatus for use in a high-wear environment, such as raisers, drum skins, pockets, and/or screens, which comprise the hardfacings of the invention.

In another aspect, the invention provides methods for making the hardfacing layers of the invention. The method may comprise the steps of a) fusion welding an austenitic stainless steel filler metal to the surface of a base metal, thereby generating a weld pool and b) adding wear resistant particles to the weld pool. The welding process may be a GMAW process. The GMAW process may involve globular transfer, spray arc transfer or may be a pulsed GMAW process with pulsed metal arc transfer. In an embodiment, the filler metal is used as the electrode in a welding gun during fusion welding. The welding process may be direct current electrode positive (DCEP). A weaving technique may be employed in which the motion of the weld gun includes both longitudinal movement in the primary direction of gun travel and transverse movement. The shield gas may comprise an inert gas such as argon and up to 5% oxygen; up to 25% carbon dioxide; or up to 5% oxygen and up to 25% carbon dioxide. The welding voltage may be 22-30V, the welding amperage may be 180-400 A, and the carbide drop rate may be 3-14 grams/second, 5-14 grams/second, or 8-14 grams/second.

The austenitic stainless steel may comprise 15-28% Cr and 8-35% Ni; 15-25% Cr and 8-35% Ni; 15-25% Cr and 8-25% Ni; 15-25% Cr and 8-20% Ni; 15-25% Cr and 8-15% Ni; or 15-23.5% Cr and 8-35% Ni (wt %). The melting range for the austenitic stainless steel may be in the range from 1375° C. to 1450° C. (2507° F. to 2642° F.). The coefficient of thermal expansion of the austenitic stainless steel filler metal may be from 13.5 to $18 \times 10^{-5}$/K (7.5 to $10 \times 10^{-5}$/° F.) in the range from room temperature to 100° C. The alloy may be ER309XX, ER316XX, ER310 or ER330. The wear resistant particles may be tungsten carbide particles. The size of the wear resistant particles added to the weld pool may be 10 to 25 mesh; 12 to 25 mesh; 12 to 30 mesh; 12 to 40 mesh; 12 to 18 mesh; or 18 to 25 mesh. The weight fraction of wear resistant particles may be from 30-55%, 30-50%, 40-55% or 40-50%.

As compared to comparable hardfacings made with mild steel filler metal, the hardfacing layers of the present invention may provide more uniform distribution of wear resistant particles within the hardfacing. Without wishing to be bound by any particular belief, the distribution of the particles may be influenced by one or more of the wetting between the molten filler metal and the wear resistant particles, the melting temperature of the filler metal, and the coefficient of thermal expansion of the filler metal.

The hardfacing layers of the present invention may also provide reduced levels of cracking as compared to hardfacings made with mild steel filler metal. Without wishing to be bound by any particular belief, the amount of cracking in the hardfacing may be influenced by one or more of the phases formed in the matrix material during solidification, the cooling rate of the matrix material, and any differences in thermal expansion between the base metal, the hardfacing matrix, and the carbide particles.

DETAILED DESCRIPTION

Figure 1A:
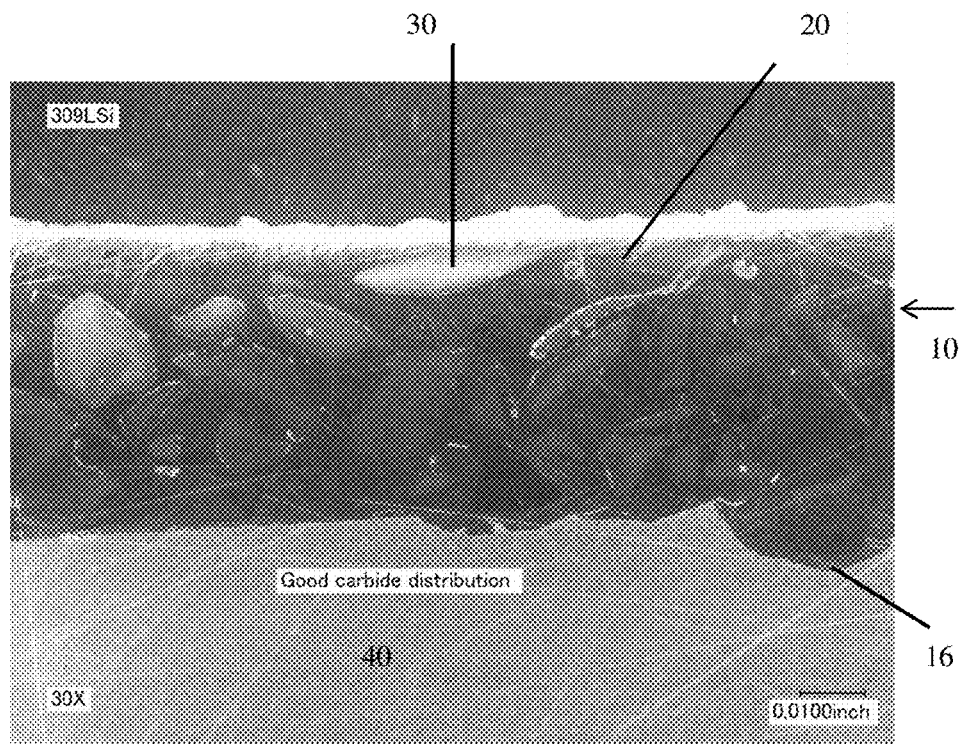
FIG. 1A: Cross-sectional view of a hardfacing, weld wire ER309LSi used in forming that hardfacing.
Figure 2A:
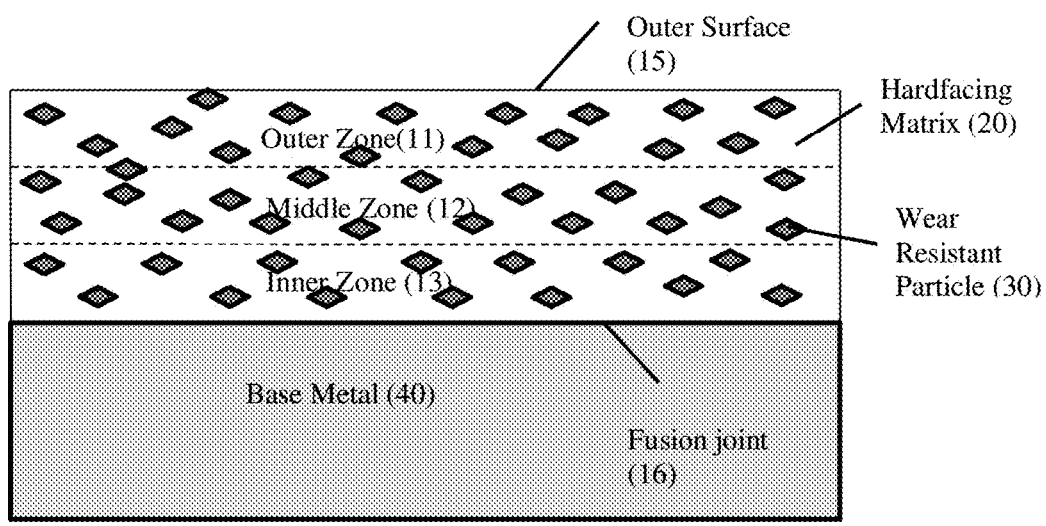
FIG. 2A: Schematic cross-sectional view of a hardfacing, showing inner, middle and outer zones of the hardfacing (the wear resistant particles shown as diamond shaped).
Figure 2B:
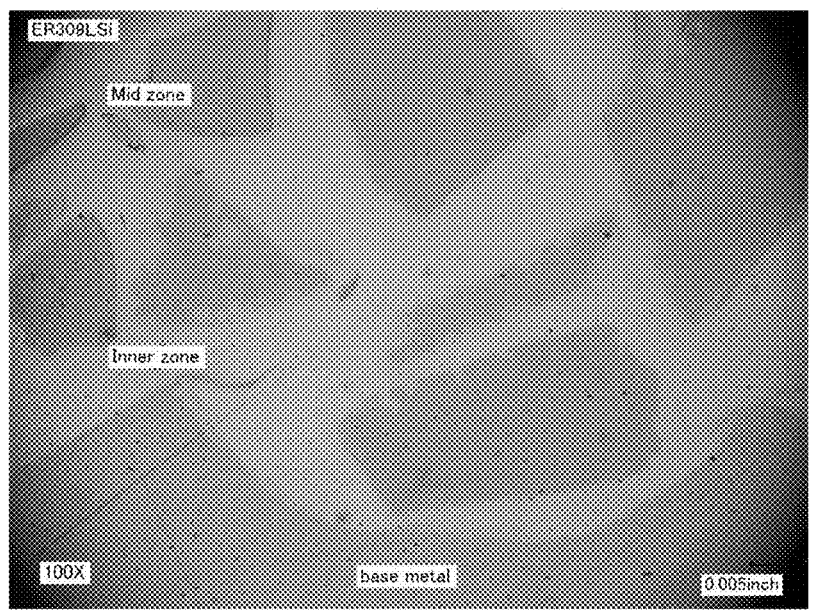
FIG. 2B: Cross-sectional view of a hardfacing made using weld wire ER309LSi, illustrating base metal, inner zone and mid zone (middle zone), magnification 100×.

FIG. 1A is a cross-sectional view of a hardfacing (10) of the invention showing the substantially uniform distribution of wear resistant particles in the hardfacing material. The matrix (20), one of the tungsten carbide particles (30), the fusion joint (16), and the base metal (40) are labeled. The hardfacing was made by a fusion welding technique using ER309LSi weld wire, as described in Example 1. FIG. 2A schematically illustrates the outer surface (15) of the hardfacing, as well as the outer zone (11), middle zone (12) and inner zone (13) thereof.

In an embodiment, the as-fabricated thickness of the hardfacing may be from 1 mm (about 0.039") to 10 mm (about 0.39"), or 2 mm (about 0.08") to 9 mm (about 0.35"). The thickness of hardfacing may vary somewhat along the article to which it is applied. In a different embodiment, the variation in thickness of the hardfacing is 0-25%, 0-30% or 0-50%.

In an embodiment, the wear resistance of the hardfacing may be assessed by methods known to the art. In an embodiment, the abrasive wear resistance of the hardfacing may be assessed using ASTM standard B611, which was developed for cemented carbides. In different embodiments, the wear number may be 5.5-11; 6.0 to 11; 6.5 to 11; or 7 to 11.

It is known in the art that some hardfacing alloys have a tendency to crack. For example, cracking may be due to the stresses induced by shrinkage of the weld metal upon cooling or any differences in thermal expansion between the base metal, the hardfacing matrix, and the carbide particles. Cracking may be assessed visually or by using a liquid penetrant such as a dye penetrant. In an embodiment, a hardfacing coating of the invention which is substantially free of cracking contains no visible surface cracks. In another embodiment, the hardfacing coating is resistant to cracking.

In an embodiment, a hardfacing coating or article comprising such hardfacing coating is resistant to chipping or shattering. In an embodiment, a hardfacing coating or article thereof has a greater resistance to chipping, shattering, and/or cracking than a hardfacing coating or article thereof which comprises a material other than austenitic stainless steel as the main filler metal.

Figure 3A:
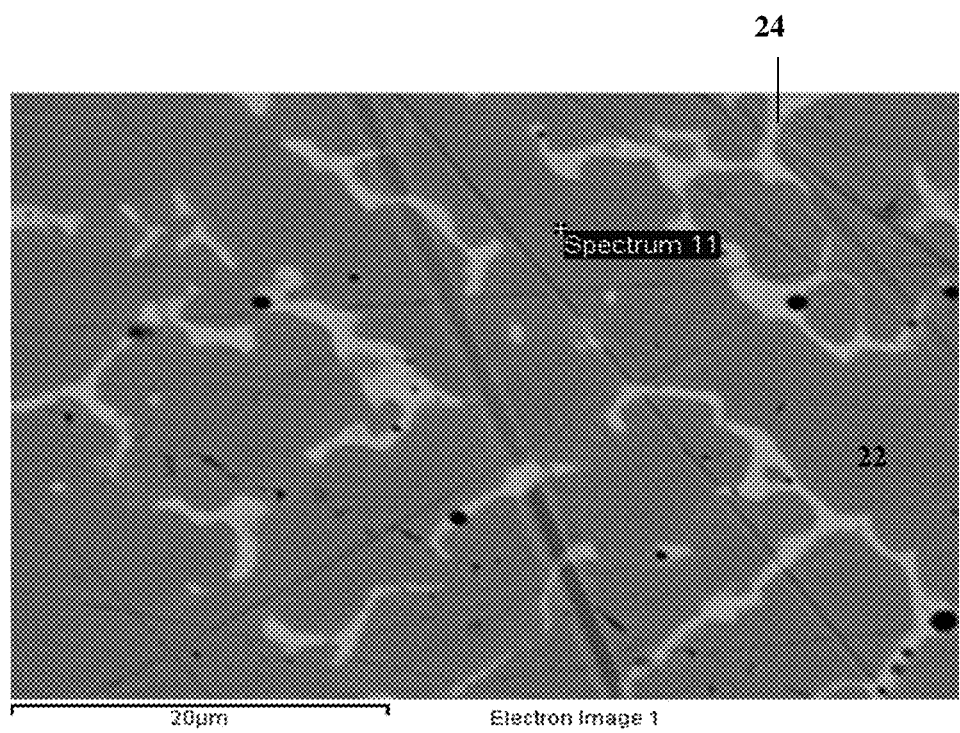
FIG. 3A: Back-scattered electron SEM image showing components of matrix material (22, 24) of a hardfacing made using weld wire ER316LSi.
Figure 3B:
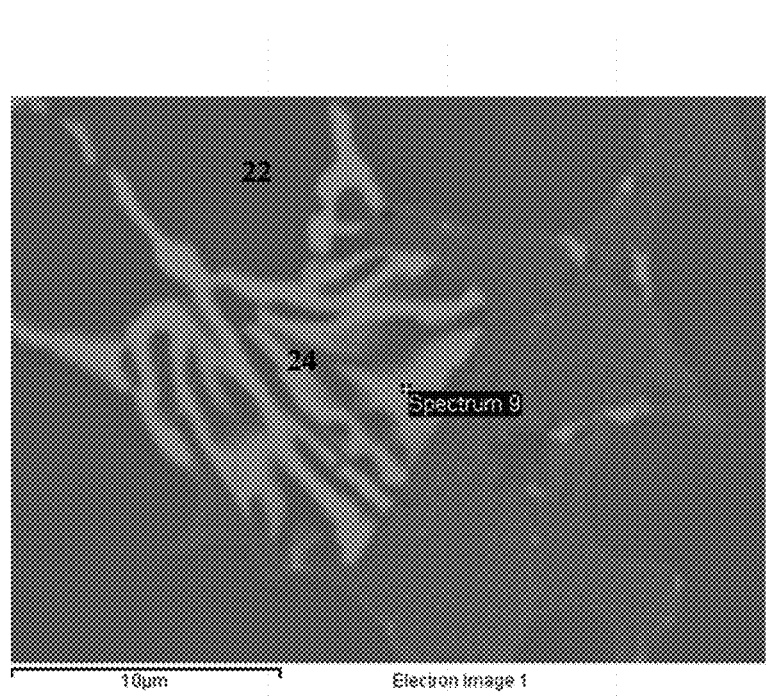
FIG. 3B: Back-scattered electron SEM image showing components (22, 24) in a hardfacing made with ER309LSi weld wire.

The matrix material may comprise two components, a first component comprising iron, chromium and nickel; and a second component comprising chromium and a substantial amount of carbon. FIG. 3A is a back-scattered electron SEM image showing these two components in a hardfacing made with ER316LSi weld wire. The first component (22, darker in this image) is dendritic in form while the second component (24, brighter in this image) is located in between the dendrites of the first component. FIG. 3B is a back-scattered electron SEM image showing these two components in a hardfacing made with ER309LSi weld wire. As shown in FIG. 3B, the second component may show some variation in composition (indicated by regions of differing contrast when viewed in back-scattered electron imaging mode).

In an embodiment, the composition of the matrix material at a particular location in the hardfacing is measured so as to include contributions from both the first and second components of the matrix material. In an embodiment, the composition of the matrix material at a particular depth in the hardfacing may be measured sufficiently far away from the tungsten carbide containing particles so that the contribution of any reaction products around the particles is excluded. In an embodiment, the distance away from the particles may be a fraction or multiple of the minimum particle size established by the mesh size range of the particles applied during the hardfacing process. For example, the composition may be measured a distance one-tenth or one-quarter of this minimum particle size away from any tungsten carbide-containing particle. In one embodiment, the composition of the matrix material at a particular location in the hardfacing may comprise from 30-75 wt % Fe, 7-28 wt % Cr, 2.5-35 wt % Ni, and 5-50 wt % W; or from 34-70 wt % Fe, 8-25 wt % Cr, 2.5-30 wt % Ni, and 6-45.5 wt % W In an embodiment, the composition of the matrix material may be determined from energy dispersive x-ray analysis (EDS or EDX) of a volume of the sample which contains both the first and second components. The volume of the sample analyzed is influenced by both the beam diameter and voltage. The average composition over a particular region or zone of the hardfacing may be determined from an average of several measurements at different locations in the specified region or zone. In an embodiment, the average amount of chromium in the matrix material is greater in the outer zone or near surface region of the hardfacing than in the inner zone or near fusion joint region of the hardfacing. In an additional embodiment, the average amount of chromium in the middle zone may be greater than in the inner zone and less than that in the outer zone. In an embodiment, the average amount of chromium in the outer zone or near surface region may be from 14 to 25 wt % chromium, while the average amount of chromium in the inner zone or near fusion joint region is from 7 to 15 wt %.

The composition of the first and second components may also be analyzed separately. In an embodiment, the iron-based alloy of the first component further comprises chromium and nickel. As used herein, an iron based alloy is an alloy in which iron is the element present in the highest concentration. When the wear resistant particles comprise tungsten carbide particles, the iron-based alloy may further comprise carbon and tungsten, at least in part from dissolution of the tungsten carbide particles. In an embodiment, the percentage of chromium in the iron-based alloy is less than that present in the weld wire used to make the hardfacing. In different embodiments, the percentage of chromium in the iron-based alloy may be from 7.5 wt % to 25 wt %; or 7.5 wt % to 20 wt %. In an embodiment, the percentage of nickel in the iron-based alloy is from 5 wt % to 35 wt % Ni; 8 wt % to 35 wt % Ni; 5 wt % to 25 wt % Ni; or 8 wt % to 25 wt % Ni. The percentage of carbon in the iron-based alloy may be greater than 2 wt %. In an embodiment, the percentage of carbon in the iron-based alloy may be from 2.5 wt % to 5 wt %; or 2.5% to 4 wt %.

In an embodiment, the second component comprises carbon and chromium. The second component may further comprise iron and nickel. When the wear resistant particles are tungsten carbide particles, the second component may additionally comprise tungsten. In an embodiment, the second component comprises carbon, chromium, iron, nickel and tungsten. The second component may generally comprise more carbon than the first component. In an embodiment, the second component comprises from 5 to 8 wt % carbon. The second component may also comprise more chromium that the first component. In an embodiment, the second component comprises 9.5 to 28 wt % chromium. When the wear resistant particles comprise tungsten carbide particles, the second component may further comprise more tungsten than the first component. In an embodiment, the second component comprises 20 to 47 wt % tungsten. The iron content of the second component may be from 30 to 50 wt %. The nickel content of the second component may be from 2.5 wt % to 4 wt %. The composition of the second component may vary with position in the hardfacing. In an embodiment, the variation in composition may be sufficient to produce regions of different contrast when the second component is imaged with a scanning electron microscope.

Figure 4:
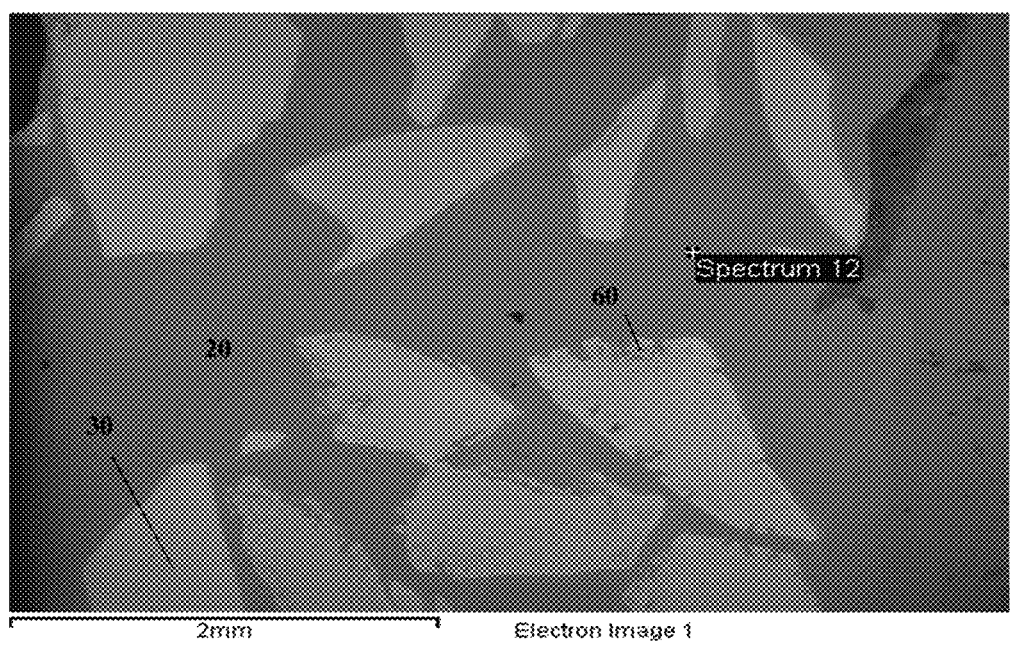
FIG. 4: SEM image of an exemplary hardfacing showing reaction products (60) present around some of the tungsten carbide particles (30), the hardfacing made using weld wire ER316LSi.

Reaction between the liquid weld metal and the carbide particles can lead to formation of reaction products near the particle surface. FIG. 4 illustrates a relatively low magnification view of reaction products (60) observed near the edge of a tungsten carbide particle for a hardfacing made with ER316LSi weld wire. These reaction products may comprise regions with varying composition. The reaction product may be a metal carbide, a ternary phase, a quaternary phase, or a combination thereof. Metal carbides formed with transition metals such as Cr, Mo or W can have high hardness and can contribute to the wear resistance of the hardfacing.

Figure 5A:
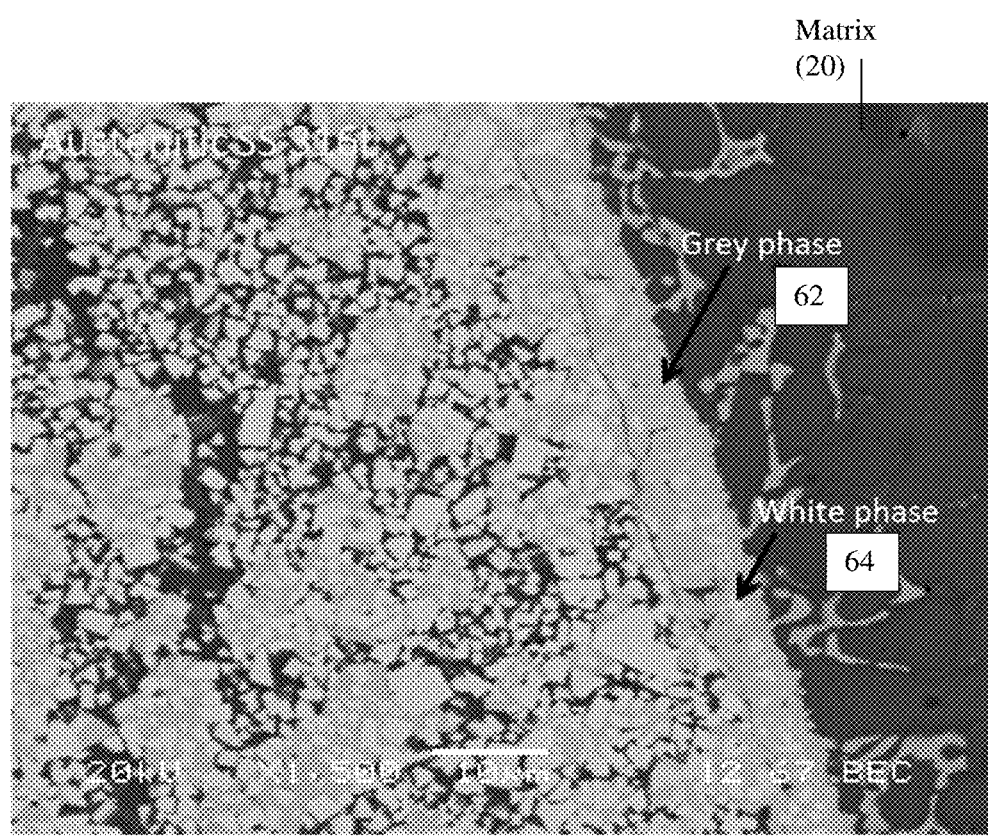
FIG. 5A: Back-scattered electron SEM image (1500×) showing portion of hardfacing near edge of a tungsten carbide particle, the hardfacing made using weld wire ER316LSi.
Figure 5B:
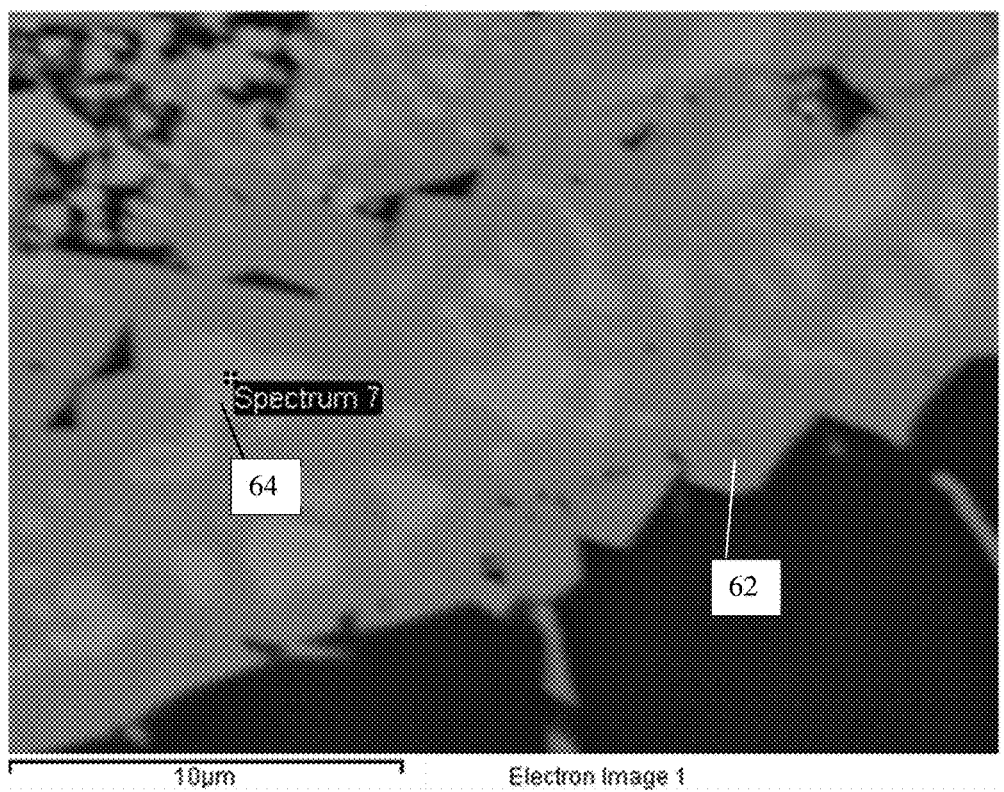
FIG. 5B: Back-scattered electron SEM image showing portion of hardfacing near edge of a tungsten carbide particle, the hardfacing made using weld wire ER309L.
Figure 6:
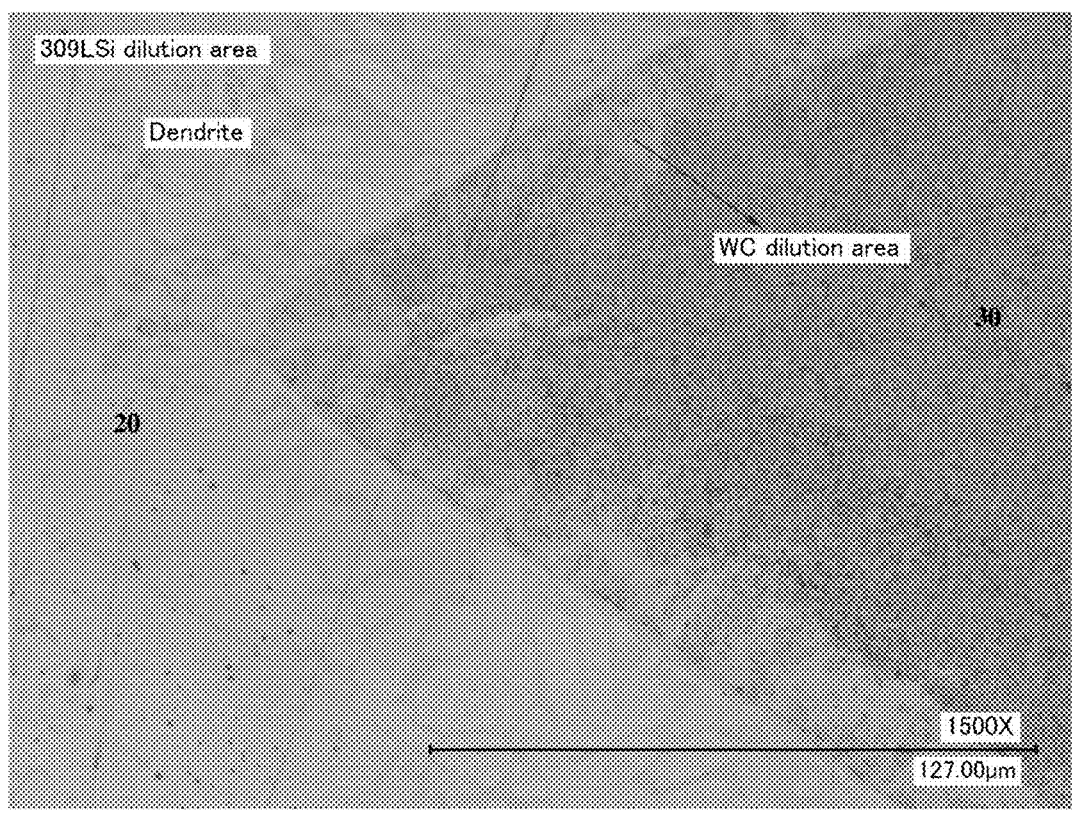
FIG. 6: Optical micrograph (1500×) showing interface between a tungsten carbide particle and the matrix material and indicating dilution area containing reaction products, the hardfacing made using weld wire ER309LSi.

In the hardfacing materials of the invention, when the wear resistant particles are tungsten carbide particles, a first type of reaction product is typically observed near the particle surface. In an embodiment, this first reaction product primarily comprises tungsten, carbon and iron. FIG. 5A shows a backscattered electron image near the edge of a tungsten carbide particle for a hardfacing made with ER316LSi weld wire. In FIG. 5A, the reaction products primarily comprising tungsten, carbon and iron, but also comprising chromium, are labeled as a "grey phase" (62). A second type of reaction product may also be observed near the particle surface. In an embodiment, this second type of reaction product primarily comprises tungsten and chromium. In FIG. 5A, this second type of reaction products is labeled as a "white phase" and is in the form of particles (64). As shown in FIG. 5A, a significant fraction of the second type of reaction products ("white phase" in FIG. 5A) are less than 5 micrometers in intercept length when viewed in cross-section. At least some of the second type of reaction product may be embedded in the first type of reaction product. FIG. 5B shows a backscattered electron image near the edge of a tungsten carbide particle for a hardfacing made with ER309LSi weld wire. The first and second type of reaction products (62, 64) are also shown in this figure, with the morphology being similar to that of FIG. 5A. FIG. 6 shows an optical micrograph near the edge of a tungsten carbide particle for a hardfacing made with ER309LSi weld wire. The "dilution zone" identified in FIG. 6 includes the first and second type of reaction products described above.

Figure 7A:
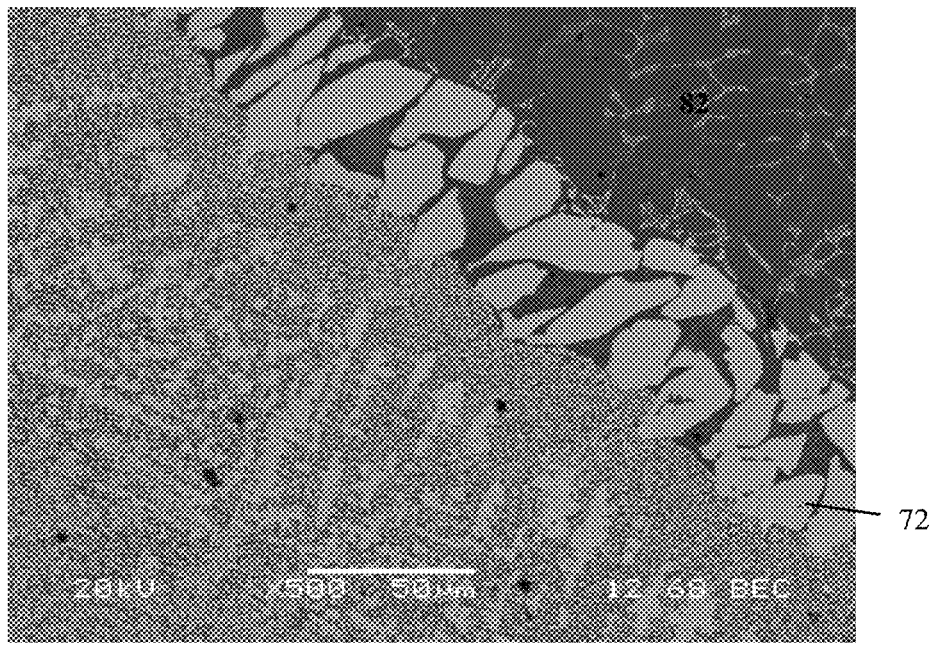
FIG. 7A: Back-scattered electron SEM image showing portion of hardfacing near edge of a tungsten carbide particle, the hardfacing made using weld wire ER70S-6.
Figure 7B:
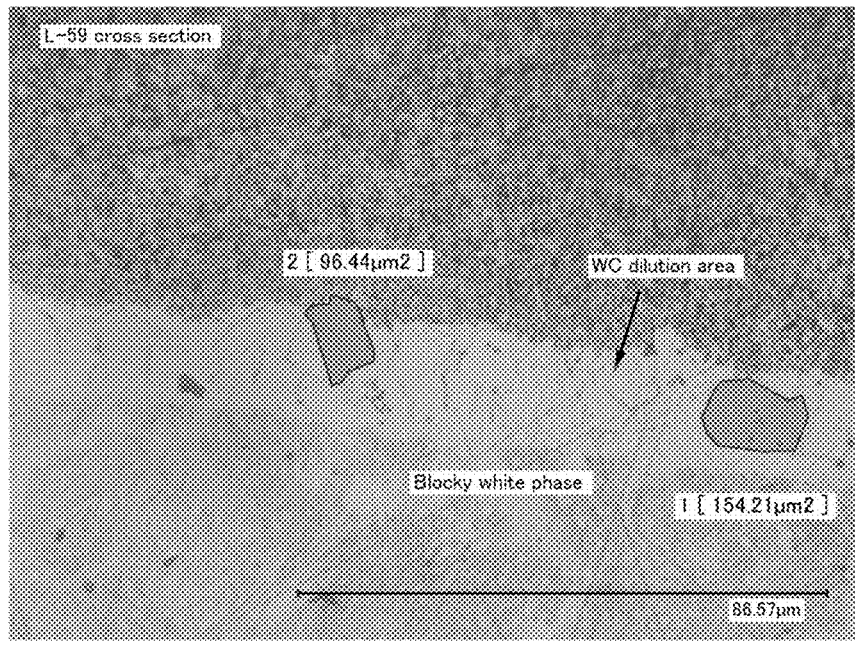
FIG. 7B: Micrograph showing portion of hardfacing near edge of tungsten carbide particle, the hardfacing made using weld wire ER70S-6.
Figure 8:
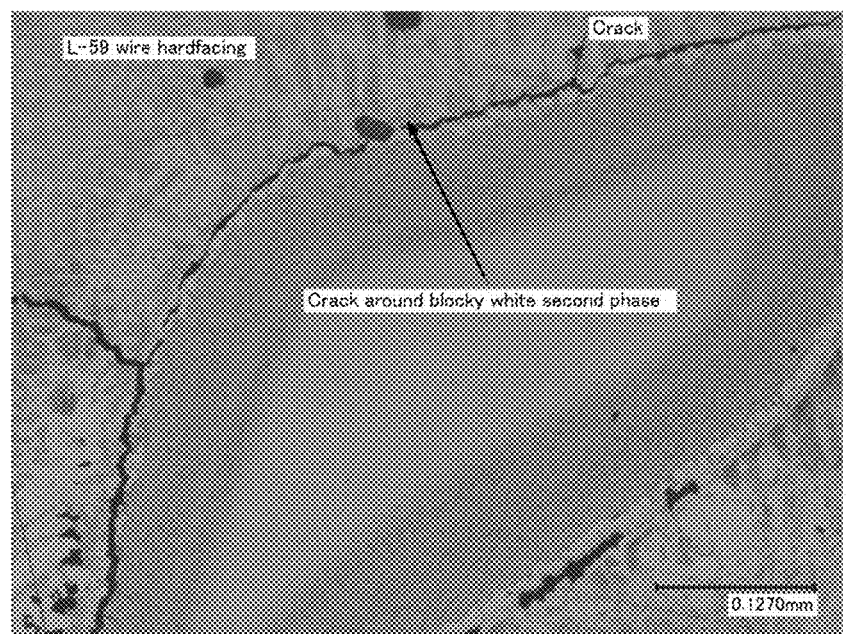
FIG. 8: Micrograph showing cracking near edge of tungsten carbide particle, the hardfacing made using weld wire ER70S-6 using the same deposition rate, wire feed speed and travel speed to hardfacing shown in FIG. 1B.

In contrast, FIGS. 7A, 7B and 8 show reaction products formed near the edge of a tungsten carbide particle for a hardfacing formed with an ER70S-6 (low alloy steel) weld wire. In FIG. 7A, a backscattered electron micrograph, these phases near the interface with the matrix material (dendritic matrix phase labeled as (82)) are lighter in color and blocky in form. This lighter colored phase (72) may primarily comprise carbon, tungsten and iron. FIG. 7B is an optical micrograph illustrating the size of some of the "blocks" of this phase. Without wishing to be bound by any particular theory, the presence of the "blocky" morphology of the reaction product, as illustrated in FIGS. 7A and 7B, appeared to lead to cracking of the hardfacing during testing, thereby decreasing the wear resistance of the alloy. FIG. 8 illustrates cracking in the vicinity of this blocky phase. In an embodiment, the reaction products formed near the edge of the tungsten carbide particle in the hardfacing layers of the invention do not form with the morphology shown in FIG. 7A, 7B or 8. For example, the reaction products near the edge of the tungsten carbide particles in the hardfacings of the present invention do not form as discontinuous relatively large blocks (e.g., intercept length, when viewed in cross-section, being greater than or equal to than 5 micrometers).

The hardness of the hardfacing matrix material may also vary with depth in the hardfacing. In an embodiment, the hardness of the matrix material at a particular depth in the hardfacing may be measured sufficiently far away from the tungsten carbide containing particles so that the contribution of any reaction products around the particles is excluded. In an embodiment, the hardness of the matrix material may be determined from an indentation measurement performed on an area of sample which contains both the first and the second components. In an embodiment, the hardness may be measured on the Rockwell C scale (HRC). In an embodiment, the hardness in the hardfacing may be from 25 to 55 HRC. In an embodiment, the average hardness of the matrix material in the outer zone of the hardfacing layer is from 35 to 55 HRC, the average hardness in the middle zone is from 30 to 45 HRC, and the average hardness in the inner zone is from 25 to 40 HRC.

As used herein, tungsten carbide particles can include WC, $W_2C$, other tungsten carbide phases, and mixtures thereof. Particles comprising tungsten carbide particles obtained from recycling of a cemented tungsten carbide material can also contain relatively small amounts of other materials such as binder material and/or coating material. For example, the particles comprising tungsten carbide may also contain cobalt, as well as smaller amounts of iron, titanium, and phosphorous, along with other possible elements. The volume fraction of particles comprising tungsten carbide in the hardfacing may be from 30% to 60%, 30-55%, 30-50%, 40 to 60%, or 30 to 50%. An average volume fraction may be determined for a particular zone or region within the hardfacing by averaging several measurements. In an embodiment, the particles comprising tungsten carbide are substantially uniformly distributed when the average volume fraction of particles comprising tungsten carbide in each of the inner, middle and outer zones of the hardfacing is from 30 to 60% or 30 to 50%. In an embodiment, the volume fraction of particles comprising tungsten carbide in the hardfacing may be measured from the area fraction of particles comprising tungsten carbide obtained from a cross-section of the hardfacing. In embodiments, the hardfacing does not include pellets formed by sintering a plurality of tungsten carbide particles together.

A weight fraction of wear resistant particles can also be calculated. The weight of the hardfacing may be measured by measuring the weight of the piece to which the hardfacing is to be applied both prior to and following application of the hardfacing. The weight of the filler metal supplied to the hardfacing process may be also be calculated. The difference of the hardfacing weight and the weight of the metal supplied to the hardfacing process gives a measure of the weight contribution of the wear resistant particles. The weight fraction of the wear resistant particles can then be taken as the ratio of the weight of the wear resistant particles to the weight of the hardfacing, as a whole. The weight fraction of wear resistant particles may be from 30-55%, 30-50%, 40-55% or 40-50%.

The number of particles comprising tungsten carbide within a given measurement area is another parameter which can be used to characterize the hardfacing. In an embodiment, the number of particles comprising tungsten carbide per square centimeter is from 90 to 150 (about 580 particles per square inch to about 970 particles per square inch); this number of particles per unit area may be present in combination with a volume fraction of particles comprising tungsten carbide of 30 to 60%; or 40 to 60%. In embodiments, the size of the wear resistant particles after formation of the hardfacing is from 0.2 to 3 mm or 0.7 mm to 1.7 mm.

The hardfacing materials of the invention may be applied to the surface of an article using a GMAW process. The GMAW process may be globular transfer, spray arc transfer or may be a pulsed GMAW process with pulsed metal arc transfer. The shield gas may be an argon mixture comprising up to 5% oxygen, an argon mixture comprising up to 25% carbon dioxide, or a combination argon mixture comprising up to 5% oxygen and up to 25% carbon dioxide. The welding voltage may be 22-30V, the welding amperage may be 180-400 A, and the carbide drop rate may be 8-14 grams/second.

In an embodiment, the consumable wire electrode is made of an austenitic stainless steel. As used herein, an austenitic stainless steel has a substantially austenitic microstructure at room temperature. Substantially austenitic microstructures may retain a small amount of other phases such as ferrite. In different embodiments, the austenitic stainless steel may comprise 15-28% Cr and 8-35% Ni; 15-25% Cr and 8-35% Ni; 15-25% Cr and 8-25% Ni, 15-25% Cr and 8-20% Ni; 15-25% Cr and 8-15% Ni; or 15-23.5% Cr and 8-35% Ni (wt %). The austenitic stainless steel may be referred to by its AWS (American Welding Society) classification. In the AWS designation ER309XX, "ER" refers to the wire which may be used as an electrode or rod, the three or four digit number such as "309" designates the nominal chemical composition of the filler metal and "XX" designates the carbon content restrictions and other alloying information In different embodiments, the austenitic stainless steel wire may be an 308 type alloy rod, an 309 type alloy rod, a 310 type alloy rod, a 316 type alloy rod, a 317 type alloy rod, a 320 type alloy rod, a 330 type alloy rod, or an 385 type alloy rod. As used herein, a YYY type alloy may also include compositional variants. For example, a 316 type alloy may include 316, 316L, or 316H. In an embodiment, the austenitic stainless steel may be an alloy in the AISI 300 series of alloys. It is noted that the 300 series of alloys may also include duplex stainless steels (e.g. 329) as well as austenitic stainless steels. In different embodiments, the austenitic stainless steel may be a 304 type alloy, a 309 type alloy, a 310 type alloy, a 316 type alloy, or a 330 type alloy (AISI designations). The alloy may be ER309XX, ER316XX, ER310 or ER330. The nominal alloy composition of 304 is 0.035% max C, 18-20% Cr, 2% max Mn, 8-13% Ni, 0.040 max P, 0.030 Max S, and 0.75 max Si, balance iron. Table 1 gives nominal alloy compositions for several other AWS 300 series alloys (amounts in weight %)

TABLE 1

| Element | ER309LSi | ER310 | ER316LSi | ER330 |
|---------|----------|-------|----------|-------|
| C | 0.03 | 0.08-0.15 | 0.03 | 0.18-0.25 |
| Cr | 23.0-25.0 | 25.0-28.0 | 18.0-20.0 | 15.0-17.0 |
| Ni | 12.0-14.0 | 20.0-22.5 | 11.0-14.0 | 34.0-37.0 |
| Mo | 0.75 | 0.75 | 2.0-3.0 | 0.75 |
| Mn | 1.0-2.5 | 1.0-2.5 | 1.0-2.5 | 1.0-2.5 |
| Si | 0.65-1.00 | 0.30-0.65 | 0.65-1.00 | 0.30-0.65 |
| P | 0.03 | 0.03 | 0.03 | 0.03 |
| S | 0.03 | 0.03 | 0.03 | 0.03 |
| N | — | — | — | — |
| Cu | 0.75 | 0.75 | 0.75 | 0.75 |

As used herein, the melting range is the range of temperatures over which a noneutectic alloy changes from solid to liquid. The melting range may be taken as the difference between the solidus temperature and the liquidus temperature. The melting range for austenitic stainless steel filler metal suitable for use with the present invention may be in the range from 1375° C. to 1450° C. (2507° F. to 2642° F.).

The coefficient of linear thermal expansion (CTE) is a material property that is indicative of the extent to which a material expands upon heating. The coefficient of thermal expansion may be defined as the fractional increase in length per unit rise in temperature. Typically the magnitude of the CTE increases with rising temperature. The mean coefficient of thermal expansion may be measured over a specified temperature range. For austenitic stainless steels, the CTE in the range from room temperature to 100° C. may be from 9.8 to $25 \times 10^{-5}$/K ($5.4$-$14 \times 10^{-5}$/F) (ASM Ready Reference: Thermal properties of metals, ed. Cverna, 2002, ASM International, p. 11.). The CTE for iron carbon alloys in the room temperature to 100° C. range may be from 10 to $12 \times 10^{-5}$/K ($5.5$-$6.5 \times 10^{-5}$/° F.). In an embodiment of the present invention, the CTE of the austenitic stainless steel filler metal may be from 13.5 to $18 \times 10^{-5}$/K (7.5 to $10 \times 10^{-5}$/° F.). in the range from room temperature to 100° C.

In an embodiment, the size of the particles comprising tungsten carbide supplied to the hardfacing process can be characterized by a mesh size range. As is known to the art, the mesh size refers to the size of the wire mesh used to screen the particles. In an embodiment, the mesh sizes used herein are per ASTM standard E-11 and may be US standard sieve numbers. As used herein, when the particle size is classified as 12-25 mesh, a majority of the particles are within the 12-25 mesh range, with a minority (for example 5-10%) being either greater than 12 mesh or less than 25 mesh. For reference, the nominal sieve opening for a no. 12 sieve is about 1.70 mm, the nominal sieve opening for a no. 25 sieve is about 0.710 mm, the nominal sieve size opening for a no. 30 sieve is about 0.6 mm and the nominal sieve size opening for a no. 40 sieve is about 0.425 mm (US Standard sieve sizing). If any dissolution of the particles comprising tungsten carbide occurs during the hardfacing process, the size of the particles may decrease from these initial values. In addition, some of the smaller particles (e.g. those which pass through a no. 30 sieve) may dissolve completely.

The base metal may be ferrous. In an embodiment, the base metal may be a steel. As used herein, a steel is an alloy of iron containing less than 2 wt % carbon. In different embodiments, the base metal may be a plain carbon steel or a low alloy steel. Suitable plain carbon steels include, but are not limited to, steels represented by the AISI/SAE designation 10xx, 15xx, 13xx, 11xx and 12xx, where the last two digits of the designation represent the carbon content, steels represented by ASTM designations A572 (all grades) and ASTM A514 (all grades) and proprietary steels such as Hardox and Wearform. In an embodiment, low alloy steels have a total alloy content less than 8 wt %. Suitable low alloy steels include steels represented by the AISI/SAE 40xx, 41xx, 43xx, 44xx, 46xx, 47xx, 48xx, 50xx, 51xx, 50xxx, 51xx, 61xx, 81xx, 86xx, 87xx, 88x, 92xx, 93xx or 94xx, where the last two or three digits of the designation represent the carbon content.

In some embodiments, the base metal is an austenitic phase stainless steel or an semi-austenitic stainless steel. Some austenitic or semi-austenitic stainless steels can have sufficiently limited magnetic characteristics to be viewed as "non-magnetic" or weakly magnetic. Austenitic stainless steels suitable for the base material include, but are not limited to, 300 series steels, 200 series steels, sintered stainless steels and cast austenitic stainless steels. Examples of 300 series steels including chromium and nickel alloying elements are 330, 310, 309, 304 and 316. Examples of 200 series steels including manganese, chromium, nickel and nitrogen alloying elements include AISI alloys 201 and 202. Semi-austenitic stainless steels include precipitation—strengthened alloys and AISI alloys 631, 632, 633, and 634. In other embodiments, the stainless steel is nitrogen strengthened austenitic Mn—Cr steel such as 15-15HS® (Carpenter, nominal composition 0.04 max % C, 16-19% Mn, 0.050 max % P, 0.050 max % S, 1.00 max % Si, 18-21% Cr. 3 max % Ni, 0.5-3% Mo, 0.5-0.99% Ni, balance Fe). In other embodiments the steel comprises 11-15% Mn and 0.8-1.25% C (e.g. a Hadfield steel).

In other embodiments, the base metal is non-ferrous. Non-ferrous base metals include nickel based alloys such as alloys comprising Ni and Cr (e.g. Inconel® alloys) and alloys comprising Ni and Cu (e.g. Monel® alloys). Non-ferrous base metals with limited magnetic properties include, but are not limited to, austenitic Ni—Cr based superalloys such as Inconel® alloys 600, 601, 625 and 718, and some Ni—Cu based alloys including Monel® K-500.

In some embodiments, a "weakly magnetic" material is characterized as having a limited relative permeability and either no or limited residual magnetization. In further embodiments, a "weakly magnetic" material is characterized by its relative permeability and by the maximum deviation that the material causes from a uniform magnetic field In some embodiments, a weakly magnetic material has a relative permeability of 3 or less. The relative permeability of weakly magnetic materials can be measured by ASTM standard A342/A342-14 (Standard Test Methods for Permeability of Weakly Magnetic Materials). ASTM standard A342/A342-14 includes four different test methods (identified as1 and 3-5). Method 1 is a fluxmetric method, method 3 measures permeability with respect to calibrated inserts, method 4 is a flux distortion method and method 5 is a vibrating sample magnetometry method.

In various aspects the hardfacing and/or the base metal may be diamagnetic, paramagnetic or ferromagnetic. Paramagnetic materials exhibit a magnetization which is proportional to the applied magnetic field and can have a relative magnetic permeability slightly greater 1. Paramagnetic materials do not retain their magnetic properties when the field is removed. Therefore, these materials are not characterized by a residual magnetization value or coercive force value. Materials which show only diamagnetic behavior can have a relative permeability slightly less than 1. If a material does not respond to a magnetic field by magnetizing, then the relative permeability is 1.

Ferromagnetic materials tend to retain their magnetic properties when the field is removed with the residual magnetization value or residual induction value depending on the material, the extent of cold work and/or precipitation hardening and the magnitude of the magnetizing field. If saturation magnetization has been achieved, the residual magnetization is greater than if saturation is not achieved. In general, the relative permeability of ferromagnetic materials is not constant, but depends on the value of the magnetic field; the maximum relative permeability can be used to characterize ferromagnetic materials. Soft magnetic materials tend to have a relative permeability much greater than one and a coercivity less than 1 kA m$^{-1}$. For example, the maximum relative permeability of a type 446 ferritic steel can be approximately 1000 with a coercivity of approximately 0.36 kA m$^{-1}$, while the maximum relative permeability of a type 420 martensitic steel can be 950 with a coercivity of approximately 0.8 kA m$^{-1}$. Hard magnetic materials do not necessarily have a relative permeability much greater than one, but have a high coercivity (e.g. >10 kA m$^{-1}$) and high remanence. For example, neodymium-iron-boron can have a relative permeability of about 1.05 and residual flux density ($B_r$~1.2 T). If the Curie temperature of the ferromagnetic material is below the predetermined operating temperature range of the hardfacing or article, the material can act as a paramagnetic material rather than a ferromagnetic material.

Austenitic stainless steels in the fully austenitic condition are paramagnetic. Factors which can contribute to formation of a ferromagnetic material include, but are not limited to, formation of ferromagnetic metal carbides, and presence of ferritic or martensitic phases in the material. For example, cast alloys of typically austenitic composition can contain a few percent of ferrite. Formation of deformation-induced martensite can also lead to creation of a weakly ferromagnetic material and an increase in the magnetic permeability. Also, composition changes during the welding process (e.g. reduction of nickel content in the hardfacing due to dilution from the base metal) can contribute to formation of ferromagnetic phases in the hardfacing.

In an aspect, the invention provides an apparatus comprising the hardfacing layers of the invention. A comminution (e.g., cutting, grinding, chopping, etc.) apparatus, which may comprise the hardfacing layers of the invention, include, but are not limited to, horizontal grinders, tub grinders, stump grinders, wood and/or brush chippers, and bale processors. In another aspect, the apparatus comprising the hardfacing layers of the invention may comprise trenchers, horizontal directional drills, boring equipment, rock wheels, and surface mining equipment. In yet a further aspect, the apparatus comprising the hardfacing layers may comprise non-comminution surfaces where impact and wear resistance still are desired, such as drum skins, pockets, and screens.

All references cited herein are hereby incorporated by reference to the extent not inconsistent with the disclosure herewith.

Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

In general the terms and phrases used herein have their art-recognized meaning, which can be found by reference to standard texts, journal references and contexts known to those skilled in the art. The preceding definitions are provided to clarify their specific use in the context of the invention.

When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. One of ordinary skill in the art will appreciate that methods, device elements, starting materials and synthetic methods, other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

References U.S. Pat. No. 8,460,604 by Junod, et al. US Patent Application Publication US 2012/0192760 by Overstreet et al.

The invention may be further understood by the following non-limiting examples.

Example 1

Hardfacing with ER309LSi

Figure 1B:
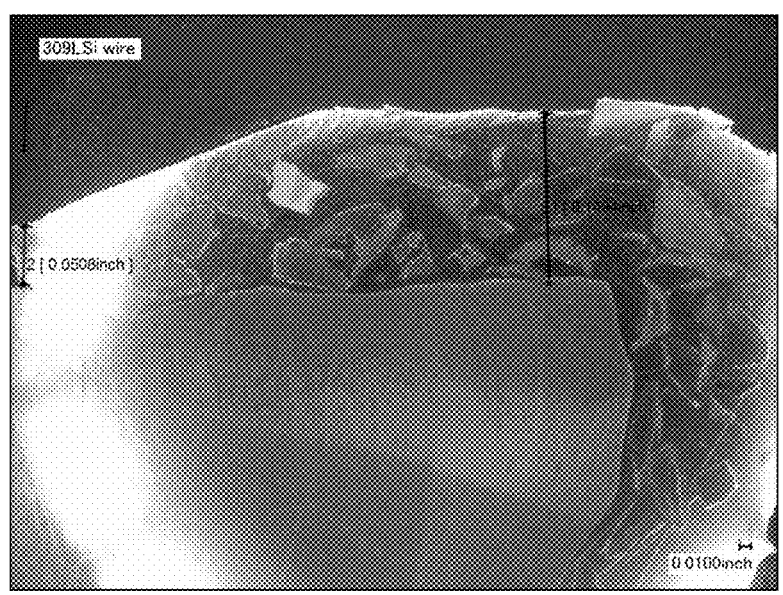
FIG. 1B: Another cross-sectional view of a hardfacing, weld wire ER309LSi used in forming that hardfacing.

A hardfacing was prepared using ER309 LSi welding wire and recycled tungsten carbide particles on a low alloy steel article. The hardfacing was applied using a GMAW welding apparatus using a weaving pattern. The nominal composition of ER309 LSi is given in Table 1. The specified composition of the low alloy steel base metal includes Cr, Mn and Mo as alloying elements. FIG. 1A is a micrograph (30×) of a cross-section of the hardfacing showing the distribution of tungsten carbide particles (before wear testing, the micrograph obtained with a digital microscope). FIG. 1B is another micrograph (30×) obtained with a digital microscope of a cross-section of the hardfacing showing the distribution of carbide particles. FIG. 1B also shows measurements of the hardfacing thickness at two locations: thickness at location 1 was 0.149" or approximately 3.79 mm and thickness at location 2 was 0.0508" or approximately 1.2 mm The initial carbide size was measured using US standard sieves as12-25 mesh. When the tungsten carbide was sifted using sieves as specified by ASTM E-11, most of the particles passed through US standard size no. 12 and were retained by US standard size no. 25.

The average wear number was 8.22 (std dev. 2.75), measured using ASTM standard B611.

Hardness measurements on a polished cross-section of an exemplary hardfacing formed with ER309LSi weld wire are given in Table 2.

TABLE 2

| Test | Hardness (HRC) | Location |
|---|---|---|
| 1 | 48.4 | Top hardfacing matrix |
| 2 | 49.2 | Top hardfacing matrix |
| 3 | 41 | Mid section hardfacing matrix |
| 4 | 42 | Mid section hardfacing matrix |
| 5 | 31.5 | Bottom hardfacing matrix |
| 6 | 30.4 | Bottom hardfacing matrix |
| 7 | 51 | Near carbide |
| 8 | 45.1 | Near carbide |
| 9 | 69.5 | Carbide |

EDS measurements on a cross-section of the hardfacing showed that alloying element concentrations for the matrix were measured in the following ranges (all in weight percent): C: 2.9-8.16%, Cr: 9.0-22.08%, Ni 3.11-11.19%, Mn 1.0-1.75%, Co 1.84-2.15% and W: 6.45-45.08%, while the Fe concentration was measured in the range: 34.66-65.24%. Alloying element concentrations for the tungsten carbide particles/reaction products near tungsten carbide particles were measured in the following ranges (wt %): C: 5.67-12.01%, Cr: 0.44-5.78%, Ni 1.41-2.68%, Co 0.8-17.51% and W: 63.52-83.52%, while the Fe concentration was measured in the range: 1.04-20.87%.

Example 2

Hardfacing with ER316LSi

Figure 1C:
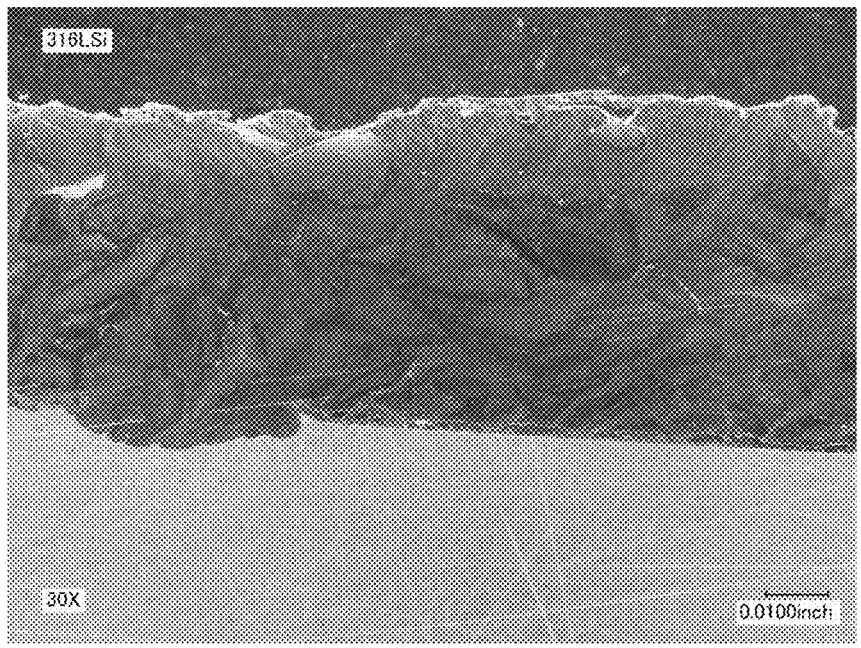
FIG. 1C: Cross-sectional view of a hardfacing, weld wire ER316LSi used in forming that hardfacing.

A hardfacing was prepared using ER316LSi welding wire and recycled tungsten carbide particles on a low alloy steel article. The hardfacing was applied using a GMAW welding apparatus using a weaving pattern. The nominal composition of ER316LSi is given in Table 1. The specified composition of the low alloy steel base metal includes Cr, Mn and Mo as alloying elements. FIG. 1C is a micrograph (30×) of a cross-section of the hardfacing, showing the distribution of tungsten carbide particles (before wear testing, micrograph obtained with a digital microscope).

Two wear test trials were run. For an initial carbide size of 12-25 mesh, the average wear number was 7.41 (std dev. 1.22) for the first trial and 7.97 (std dev. 1.35) for the second trial, both measured using ASTM standard B611.

Hardness measurements on a polished cross-section of an exemplary hardfacing formed with ER316LSi weld wire are given in Table 3. On other samples the surface hardness (away from the carbide or second phase) ranged between 38.3 and 44.4 HRC; the hardness measured in the midsection was 45.2; and the hardness at the bottom ranged from 28.3 to 35 HRC.

TABLE 3

| Test | Hardness (HRC) | Location |
| --- | --- | --- |
| 12 | 47.7 | Top hardfacing matrix |
| 13 | 45.9 | Top hardfacing matrix |
| 14 | 40.7 | Mid section hardfacing matrix |
| 15 | 36.1 | Mid section hardfacing matrix |
| 16 | 33.0 | Bottom hardfacing matrix |
| 17 | 30.2 | Bottom hardfacing matrix |
| 18 | 53.6 | Near carbide |
| 19 | 45.1 | Near carbide |
| 20 | 69.0 | Carbide |

EDS measurements on a cross-section of the hardfacing showed that the highest concentrations of alloying elements measured were (all in weight percent): C: 7.56%, Cr: 18.64%, Ni 8.54%, Mo 5.41%, Mn 1.51%, Cu 0.75.

EDS measurements on a cross-section of the hardfacing showed that alloying element concentrations for the matrix were measured in the following ranges (all in weight percent): C: 2.72-7.56%, Cr: 10.57-18.64%, Ni 3.59-8.54%, Mo: 5.41%, Mn 1.43-2.1% and W: 6.6-25.35%, while the Fe concentration was measured in the range: 42.67-69.06%. Alloying element concentrations for the tungsten carbide particles/reaction products near tungsten carbide particles were measured in the following ranges (wt %): C: 5.08-7.81%, Cr: 3.28-3.38%, Ni 2.04%, Co 1.71% and W: 68.6-85.31%, while the Fe concentration was measured in the range: 3.61-19.18%.

FIG. 3A shows a back-scattered electron SEM image of the matrix showing both dendrites of the first component (22) and a portion of the interdendritic region (24). At least some of the brighter regions of the interdendritic region appeared to be richer in tungsten and poorer in chromium than the darker regions.

Example 3

Hardfacing with ER310

Figure 1D:
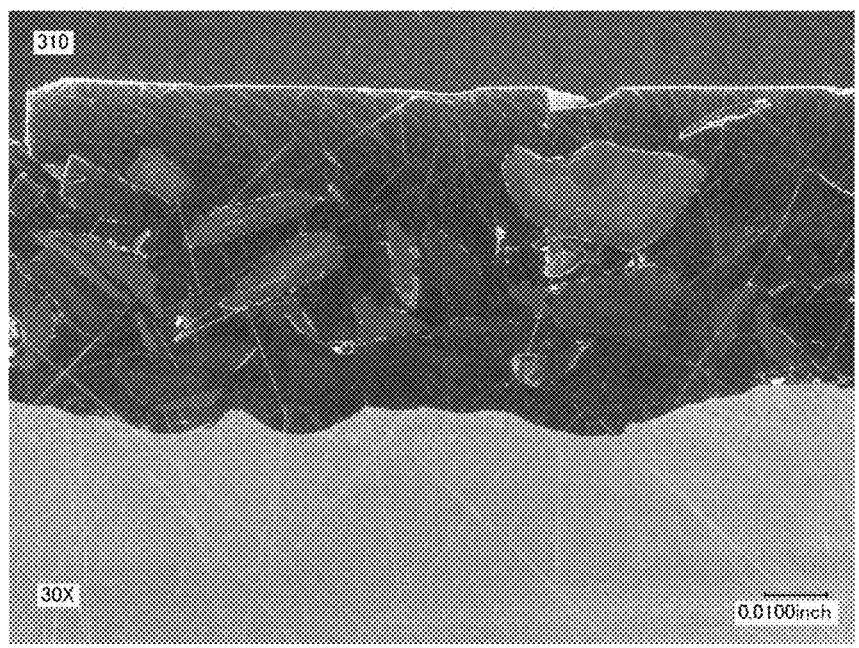
FIG. 1D: Cross-sectional view of a hardfacing, weld wire ER310 used in forming that hardfacing.

A hardfacing was prepared using ER310 welding wire and recycled tungsten carbide particles on a low alloy steel article. The hardfacing was applied using a GMAW welding apparatus using a weaving pattern. The nominal composition of ER310 is given in Table 1. The specified composition of the low alloy steel base metal includes Cr, Mn and Mo as alloying elements. FIG. 1D is a micrograph (30×) of a cross-section of the hardfacing showing the distribution of tungsten carbide particles (before wear testing, micrograph obtained with a digital microscope).

For an initial carbide size of 12-25 mesh, the average wear number was 7.28 (std dev. 1.03), measured using ASTM standard B611.

Hardness measurements on a polished cross-section of an exemplary hardfacing formed with ER310 weld wire are given in Table 4.

TABLE 4

| Test | Hardness (HRC) | Location |
| --- | --- | --- |
| 24 | 49.2 | Top hardfacing matrix |
| 25 | 50.1 | Top hardfacing matrix |
| 26 | 50.8 | Mid section hardfacing matrix |
| 27 | 53.8 | Mid section hardfacing matrix |
| 28 | 48.7 | Bottom hardfacing matrix |
| 29 | 47.6 | Bottom hardfacing matrix |
| 30 | 58.5 | Near carbide |
| 31 | 51 | Near carbide |
| 32 | 69 | Carbide |

EDS measurements on a cross-section of the hardfacing showed that alloying element concentrations for the matrix were measured in the following ranges (all in weight percent): C: 3.96-6.3%, Cr: 14.2-24.37%, Ni 8.82-19.43%, Mn 1.53-1.72% and W: 11.16-23.87%, while the Fe concentration was measured in the range: 35.02-49.72. Alloying element concentrations for the tungsten carbide particles/reaction products near tungsten carbide particles were measured in the following ranges (wt %): C: 49.94-10.24%, Cr: 0.48-6.78%, Ni 5.73%, Co 1.27% and W: 67.22-88.77%, while the Fe concentration was measured in the range: 0.51-16.07%.

Example 4

Hardfacing with ER 330

Figure 1E:
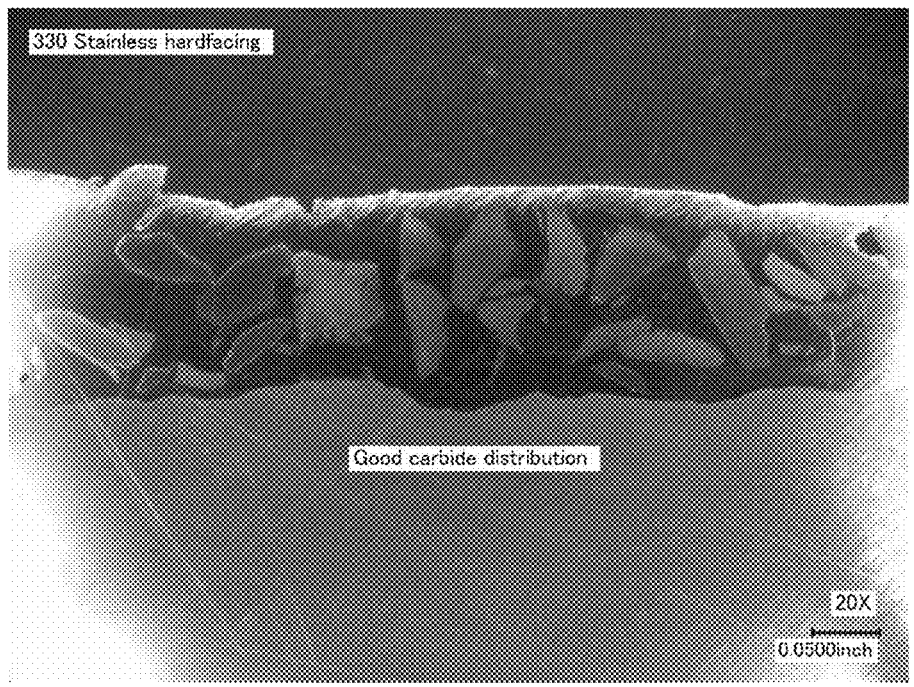
FIG. 1E: Cross-sectional view of a hardfacing, weld wire ER330 used in forming that hardfacing

A hardfacing was prepared using ER330 welding wire and recycled tungsten carbide particles on a low alloy steel article. The hardfacing was applied using a GMAW welding apparatus using a weaving pattern. The nominal composition of ER330 is given in Table 1. The specified composition of the low alloy steel base metal includes Cr, Mn and Mo as alloying elements. FIG. 1E is a micrograph (20×) of a cross-section of the hardfacing, showing the distribution of tungsten carbide particles (micrograph obtained with a digital microscope).

The initial carbide size was 12-25 mesh.

Hardness measurements on a polished cross-section of an exemplary hardfacing formed with ER330 weld wire are given in Table 5.

TABLE 5

| Test | Hardness (HRC) | Test Location |
| --- | --- | --- |
| 1 | 25.7 | Weld Bottom |
| 2 | 25.8 | Weld Bottom |
| 3 | 38.2 | Weld Middle |
| 4 | 36.5 | Weld Middle |
| 5 | 37.8 | Weld Top |
| 6 | 40.7 | Weld Top |
| 7 | 64.2 | Second Phase |
| 8 | 62.4 | Second Phase |

TABLE 5-continued

| Test | Hardness (HRC) | Test Location |
|---|---|---|
| 9 | 65.9 | Tungsten Carbide |
| 10 | 70.1 | Tungsten Carbide |

Example 5

Comparative Hardfacing with ER70S-6

Figure 1F:
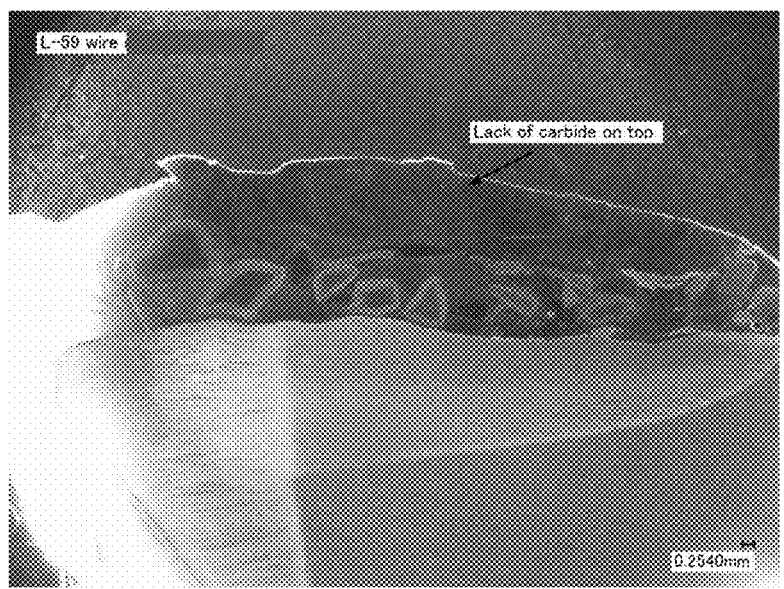
FIG. 1F: Cross-sectional view of hardfacing, weld wire ER70S used in forming that hardfacing.

A hardfacing was prepared using ER70S-6 welding wire and recycled tungsten carbide particles on a low alloy steel article. L-59® (the Lincoln Electric Company) is an example of ER70S-6 wire; L-59® is copper coated. The hardfacing was applied using a GMAW welding apparatus using a weaving pattern. The nominal composition of ER70S-6 is 0.06-0.15% C, 1.4-1.85% Mn, 0.8-1.15% Si, 0.035 max % S, 0.025 max % P, 0.5 max % Cu, 0.15 max % Ni, 0.15 max % Cr, 0.15 max % Mo, 0.03 max % V (wt %). The specified composition of the low alloy steel base metal includes Cr, Mn and Mo as alloying elements. FIG. 1F is a micrograph (30×) of a cross-section of the hardfacing taken with a digital microscope, showing the non-uniform distribution of tungsten carbide particles, with most of the tungsten carbide particles being located near the fusion joint of the hardfacing. The hardfacing in FIG. 1F was made using the same carbide drop rate, wire feed speed and travel speed as in the hardfacing shown in FIG. 1B.

For an initial carbide size of 12-25 mesh, the average wear number was 5.14 (std dev. 1.54), measured using ASTM standard B611.

Hardness measurements on a polished cross-section of an exemplary hardfacing formed with ER70S-6 weld wire are given in Table 6.

TABLE 6

| Test | Hardness (HRC) | Location |
|---|---|---|
| 1 | 59 | Surface weld matrix |
| 2 | 62.8 | Surface weld matrix |
| 3 | 54.7 | Mid section weld matrix |
| 4 | 55.1 | Mid section weld (martensitic) |
| 5 | 67.2 | Second phase |
| 6 | 49.6 | Second phase white block |
| 7 | 49.4 | Second phase white block |
| 8 | 65.3 | Carbide |
| 9 | 56 | Mid section weld (martensitic) |
| 10 | 48.2 | Second phase white block |
| 11 | 70.1 | Carbide center |

EDS measurements on a cross-section of the hardfacing showed that alloying element concentrations for the matrix were measured in the following ranges (all in weight percent): C: 5.83-8.87%, Mn 1.09-1.18%, and W: 11.06-42.39%, while the Fe concentration was measured in the range: 47.56-79.88%. Alloying element concentrations for the tungsten carbide particles/reaction products near tungsten carbide particles were measured in the following ranges (wt %): C: 8.02-10.71%, Co 2.2-7.08%, W: 67.8-74.96%, and other 0.64-6.24% while the Fe concentration was measured in the range: 1.01-18.22%.

Example 6

Magnetic Properties of Hardfacing with ER 310

A hardfacing made with recycled tungsten carbide particles (12-22 mesh) and ER 310 as the weld matrix was measured using ASTM A342 Method 3 to have a magnetic permeability between 1.2μ and 1.6μ. (relative permeability of 1.2 to 1.6). The base material was 15-15HS® a nitrogen strengthened stainless steel; and the hardfacing was sectioned from the base metal before testing. The recycled tungsten carbide particles are expected to include some cobalt binder material and/or some TiN coating material.

We claim:

1. An article comprising a hardfacing layer joined to a metal surface by the process of
   (a) fusion welding an austenitic stainless steel filler metal to the surface of a base metal, thereby generating a weld pool; and
   (b) adding a plurality of particles comprising tungsten carbide to the weld pool,
   wherein the austenitic steel filler metal comprises 18-35% Ni, and the volume fraction of tungsten carbide particles in the hardfacing layer is from 30% to 60%, and the particles have a size selected from the range of 12-25mesh, and
   wherein the hardfacinq comprises an outer zone, a middle zone and an inner zone, the inner zone being adjacent to the metal fusion bond, the outer zone being adjacent to the outer surface of the hardfacinq and the middle zone being between the inner and outer zones and the average chromium content of the matrix material in the outer zone is greater than the average chromium content of the matrix material in the inner zone.

2. The article of claim 1, wherein the article is characterized by a relative magnetic permeability less than 1.75.

3. The article of claim 2, wherein the base metal is selected from the group consisting of iron based alloys or nickel based alloys.

4. The article of claim 2, wherein the base metal is an austenitic stainless steel.

5. The article of claim 1, wherein the fusion welding process is a gas metal arc welding process.

6. The article of claim 1, wherein the average chromium content of the matrix material in the outer zone is from 14 to 25 wt % chromium.

7. The article of claim 1, wherein the average hardness of the matrix material in the outer zone is greater than the average hardness of the matrix material in the inner zone.

8. The article of claim 7, wherein the average hardness of the matrix material in the outer zone of the hardfacing layer is from 35 to 55 HRC.

9. The article of claim 1, wherein the hardfacing layer is substantially free of cracks.

10. A hardfacing layer joined to at least a portion of a metal surface by a metal fusion bond, the hardfacing layer comprising:
   (a) a matrix material comprising:
      (i) a first component comprising an iron based alloy, the iron based alloy further comprising chromium and nickel; and
      (ii) a second component comprising carbon, chromium, tungsten and iron; and
   (b) a plurality of particles comprising tungsten carbide substantially uniformly distributed in the matrix material, the volume fraction of particles in the hardfacing layer being from 30% to 60%;
   wherein the matrix material comprises 7 -28wt % Cr, 2.5 -35 wt % Ni, 5 -50 wt % W, and 30 -75 wt % Fe; and
   wherein the matrix material comprises dendrites of the first component and the second component is located in between the dendrites of the first component.

11. A hardfacing layer joined to at least a portion of a metal surface by a metal fusion bond, the hardfacing layer comprising:
   (a) a matrix material comprising:
      (i) a first component comprising an iron based alloy, the iron based alloy further comprising chromium and nickel; and
      (ii) a second component comprising carbon, chromium, tungsten and iron; and
   (b) a plurality of particles comprising tungsten carbide substantially uniformly distributed in the matrix material, the volume fraction of particles in the hardfacing layer being from 30% to 60%;
   wherein the matrix material comprises 7-28 wt % Cr, 2.535wt % Ni, 5-50 wt % W, and 30-75 wt % Fe; and wherein the hardfacing comprises an outer zone, a middle zone and an inner zone, the inner zone being adjacent to the metal fusion bond, the outer zone being adjacent to the outer surface of the hardfacing and the middle zone being between the inner and outer zones and the average chromium content of the matrix material in the outer zone is greater than the average chromium content of the matrix material in the inner zone.

12. The hardfacing layer of claim 11, wherein average chromium content of the matrix material in the outer zone is from 14 to 25 wt % chromium.

13. A hardfacing layer joined to at least a portion of a metal surface by a metal fusion bond, the hardfacing layer comprising:
   (a) a matrix material comprising:
      (i) a first component comprising an iron based alloy, the iron based alloy further comprising chromium and nickel; and
      (ii) a second component comprising carbon, chromium, tungsten and iron; and
   (b) a plurality of particles comprising tungsten carbide substantially uniformly distributed in the matrix material, the volume fraction of particles in the hardfacing layer being from 30% to 60%;
   wherein the matrix material comprises 7-28 wt % Cr, 2.5-35 wt % Ni, 5-50 wt % W, and 30-75 wt % Fe; and wherein the hardfacing comprises an outer zone, a middle zone and an inner zone, the inner zone being adjacent to the metal fusion bond, the outer zone being adjacent to the outer surface of the hardfacing and the middle zone being between the inner and outer zones and the and the average hardness of the matrix material in the outer zone is greater than the average hardness of the matrix material in the inner zone.

14. The hardfacing layer of claim 13, wherein the average hardness of the matrix material in the outer zone of the hardfacing layer is from 35 to 55 HRC.

15. An article comprising a hardfacing layer joined to a metal surface by the process of
   (a) fusion welding an austenitic stainless steel filler metal to the surface of a base metal, thereby generating a weld pool; and
   (b) adding a plurality of particles comprising tungsten carbide to the weld pool,
   wherein the austenitic steel filler metal comprises 18-28% Cr and 8-35% Ni, and the volume fraction of tungsten carbide particles in the hardfacing layer is from 30% to 60%, and the particles have a size selected from the range of 12-25mesh, and
   wherein the hardfacing comprises an outer zone, a middle zone and an inner zone, the inner zone being adjacent to the metal fusion bond, the outer zone being adjacent to the outer surface of the hardfacing and the middle zone being between the inner and outer zones and the average hardness of the matrix material in the outer zone is greater than the average hardness of the matrix material in the inner zone.

* * * * *